US009448321B2

(12) United States Patent
Sinha et al.

(10) Patent No.: US 9,448,321 B2
(45) Date of Patent: Sep. 20, 2016

(54) TORSIONAL WAVE LOGGING

(71) Applicant: SCHLUMBERGER TECHNOLOGY CORPORATION, Sugar Land, TX (US)

(72) Inventors: Bikash K. Sinha, Cambridge, MA (US); Sandip Bose, Brookline, MA (US); Jiaqi Yang, Belmont, MA (US); Ting Lei, Cambridge, MA (US); Tarek M. Habashy, Burlington, MA (US); Smaine Zeroug, Ridgefield, CT (US); Ma Luo, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 448 days.

(21) Appl. No.: 13/734,728

(22) Filed: Jan. 4, 2013

(65) Prior Publication Data
US 2014/0192619 A1   Jul. 10, 2014

(51) Int. Cl.
*G01V 1/50* (2006.01)
*E21B 47/00* (2012.01)

(52) U.S. Cl.
CPC ............. *G01V 1/50* (2013.01); *E21B 47/0005* (2013.01)

(58) Field of Classification Search
CPC ....... G01V 1/50; G01V 1/44; E21B 47/0005
USPC ............................................ 367/35; 181/105
See application file for complete search history.

(56) References Cited

U.S. PATENT DOCUMENTS

| | | | | |
|---|---|---|---|---|
| 3,401,773 A * | 9/1968 | Synnott, III | ..................... | 367/34 |
| 3,732,947 A * | 5/1973 | Moran et al. | ..................... | 367/35 |
| 3,747,702 A * | 7/1973 | Beil | .......................... | G01V 1/44 367/35 |
| 4,191,250 A * | 3/1980 | Messenger | .................. | 166/253.1 |
| 4,217,659 A * | 8/1980 | Glenn, Jr. | ........................ | 367/35 |
| 4,283,779 A * | 8/1981 | Lamel | ............................. | 367/82 |
| 4,380,806 A * | 4/1983 | Waters | ................... | G01V 1/375 367/27 |
| 4,394,754 A * | 7/1983 | Waters | .......................... | 367/75 |
| 4,698,792 A * | 10/1987 | Kurkjian et al. | ................ | 367/31 |
| 4,893,285 A * | 1/1990 | Masson et al. | ................... | 367/35 |
| 4,984,652 A * | 1/1991 | Batzle et al. | .................. | 181/104 |
| 7,525,872 B2 * | 4/2009 | Tang et al. | ...................... | 367/35 |
| 7,595,737 B2 | 9/2009 | Fink et al. | | |
| 2006/0001549 A1 | 1/2006 | Shah et al. | | |
| 2009/0251993 A1 | 10/2009 | Berris, Jr. et al. | | |
| 2011/0186290 A1* | 8/2011 | Roddy et al. | .............. | 166/253.1 |
| 2012/0123757 A1 | 5/2012 | Erias et al. | | |

OTHER PUBLICATIONS

International Search Report and Written Opinion of PCT Application No. PCT/US2013/069034 dated Feb. 6, 2014: pp. 1-12.
(Continued)

Primary Examiner — Ian J Lobo
(74) Attorney, Agent, or Firm — Jakub Michna

(57) ABSTRACT

A method for torsional wave logging in a borehole of a subterranean formation. The method includes obtaining a torsional wave measurement of the borehole, wherein the torsional wave measurement represents characteristics of a torsional wave propagating within a cylindrical layered structure associated with the borehole, wherein the cylindrical layered structure comprises the subterranean formation and a completion of the borehole, analyzing, by a computer processor, the torsional wave measurement to generate a quality measure of the completion, and displaying the quality measure of the completion.

18 Claims, 15 Drawing Sheets

(56) References Cited

OTHER PUBLICATIONS

Ekstrom, "Dispersion Estimation from Borehole Acoustic Arrays Using a Modified Matrix Pencil Algorithm," Proceedings of ASILOMAR-29, 1996: pp. 449-453.

Kimball et al., "Semblance processing of borehole acoustic array data," Geophysics, Mar. 1984, vol. 49(3): pp. 274-281.

Sinha, "Sensitivity and inversion of borehole flexural dispersions for formation parameters," Geophys. J. Int., 1997, vol. 128: pp. 84-96.

* cited by examiner

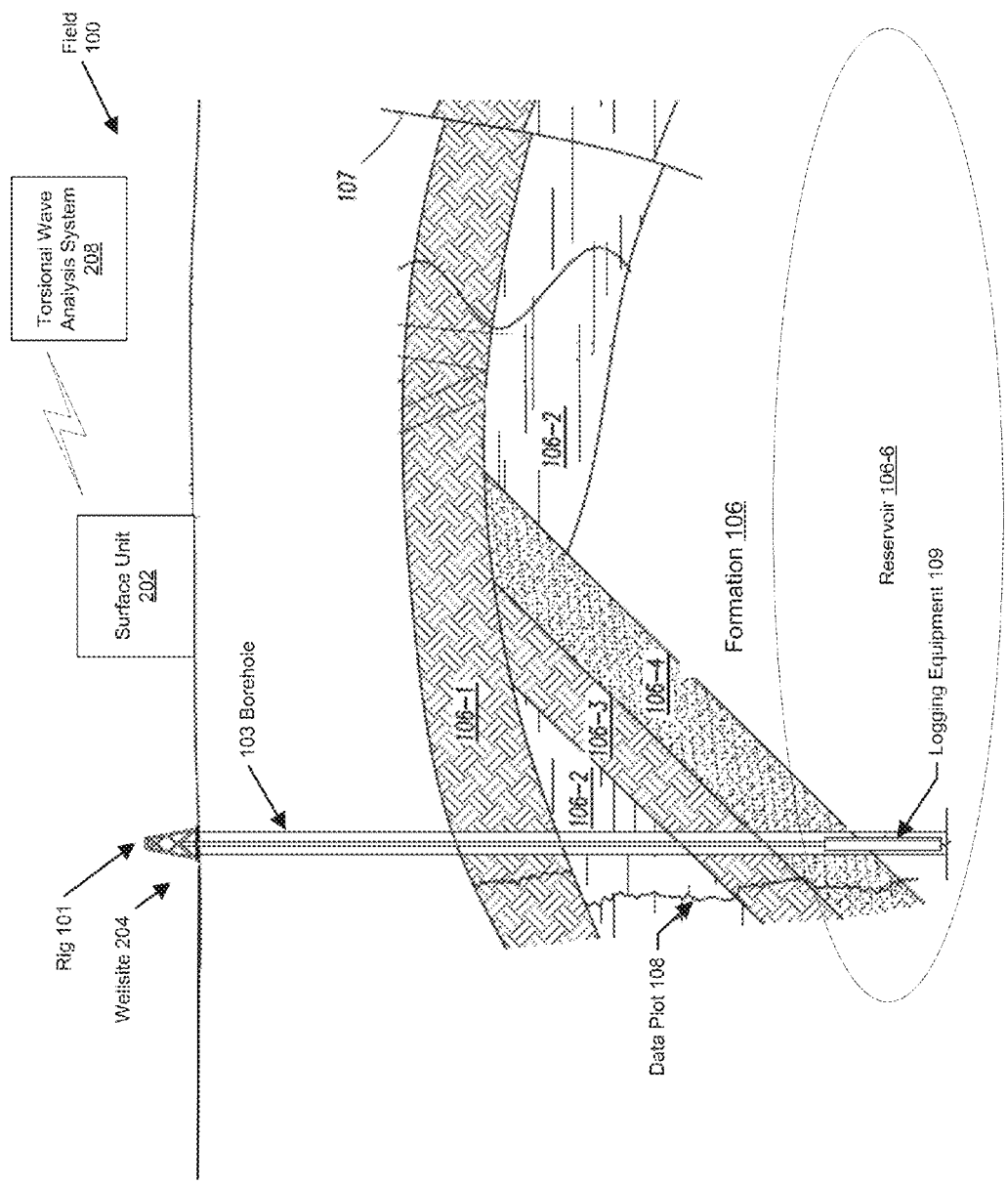
FIG. 1.1

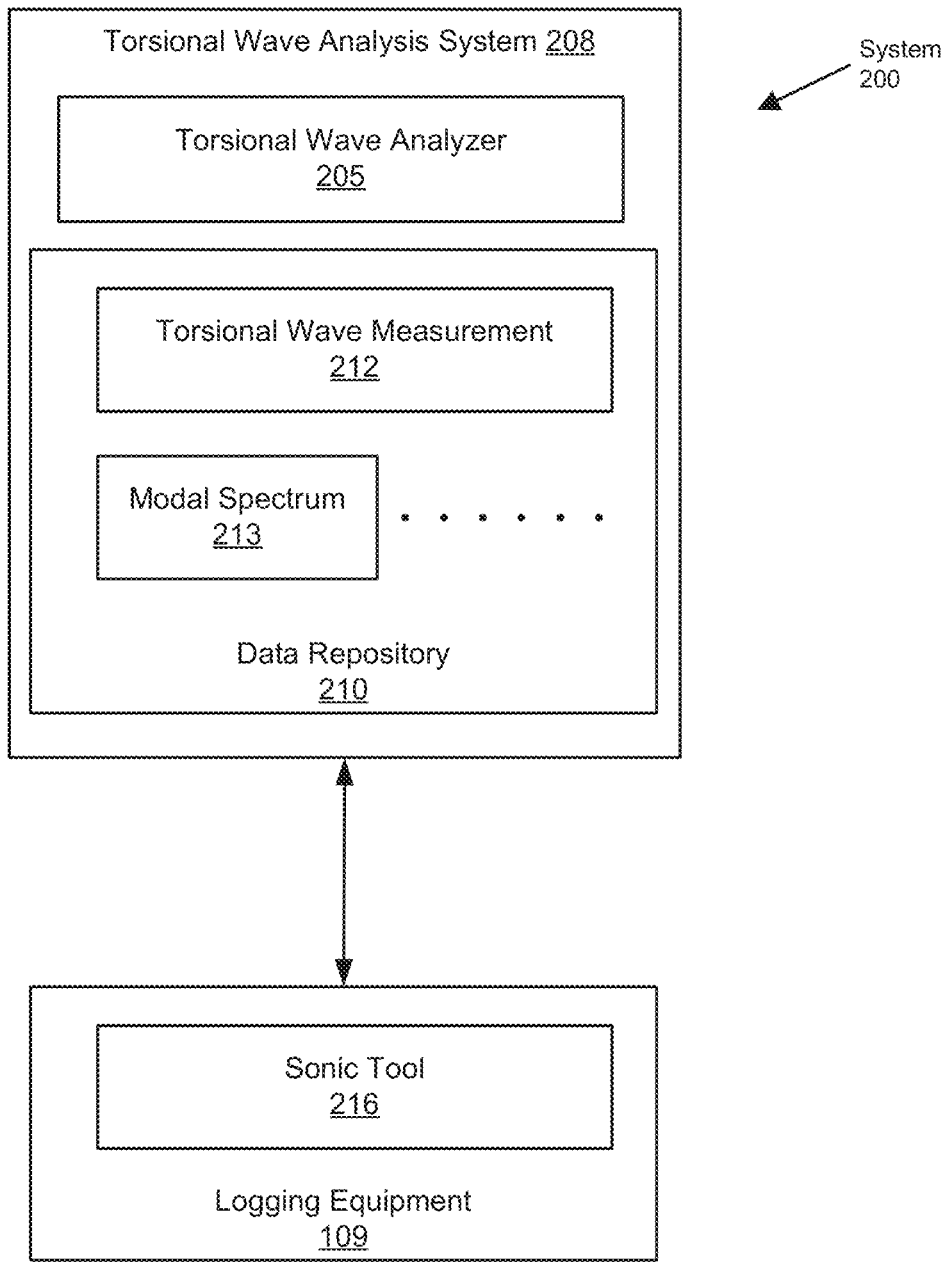
FIG. 1.2

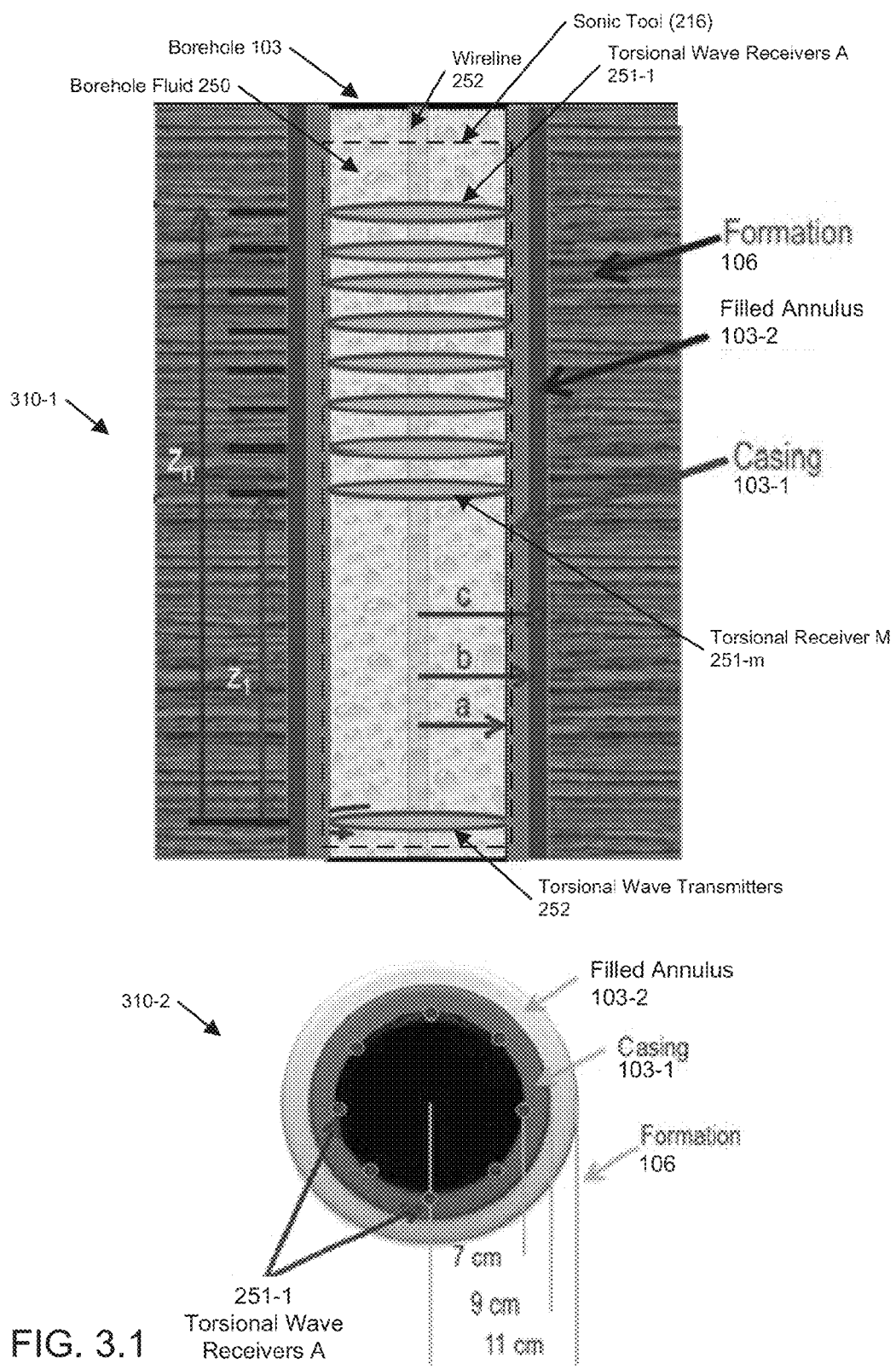
FIG. 3.1

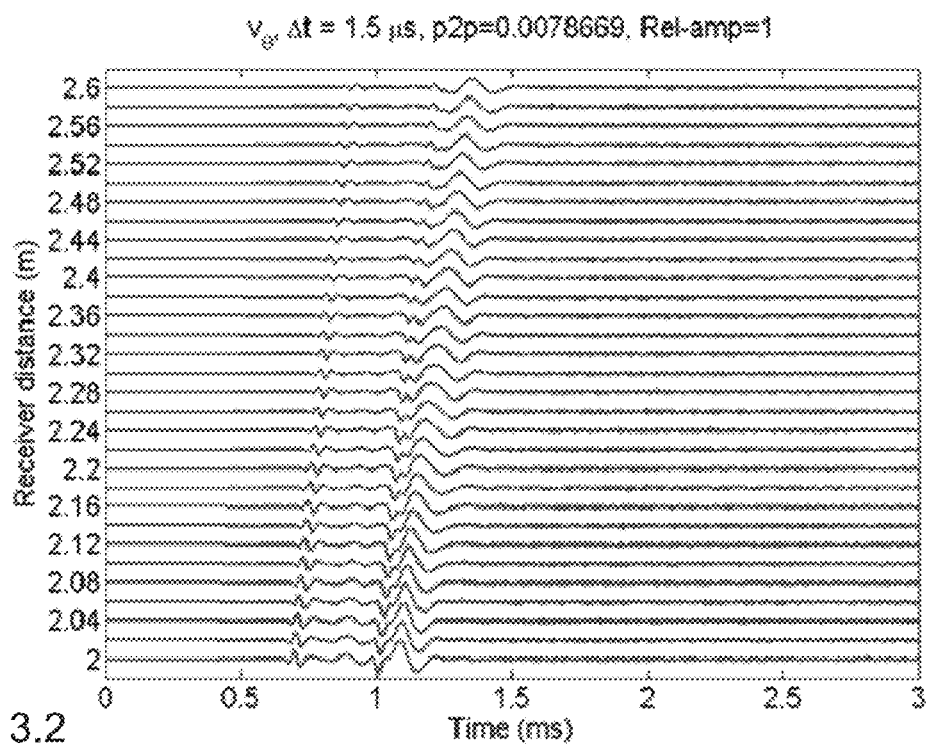
FIG. 3.2
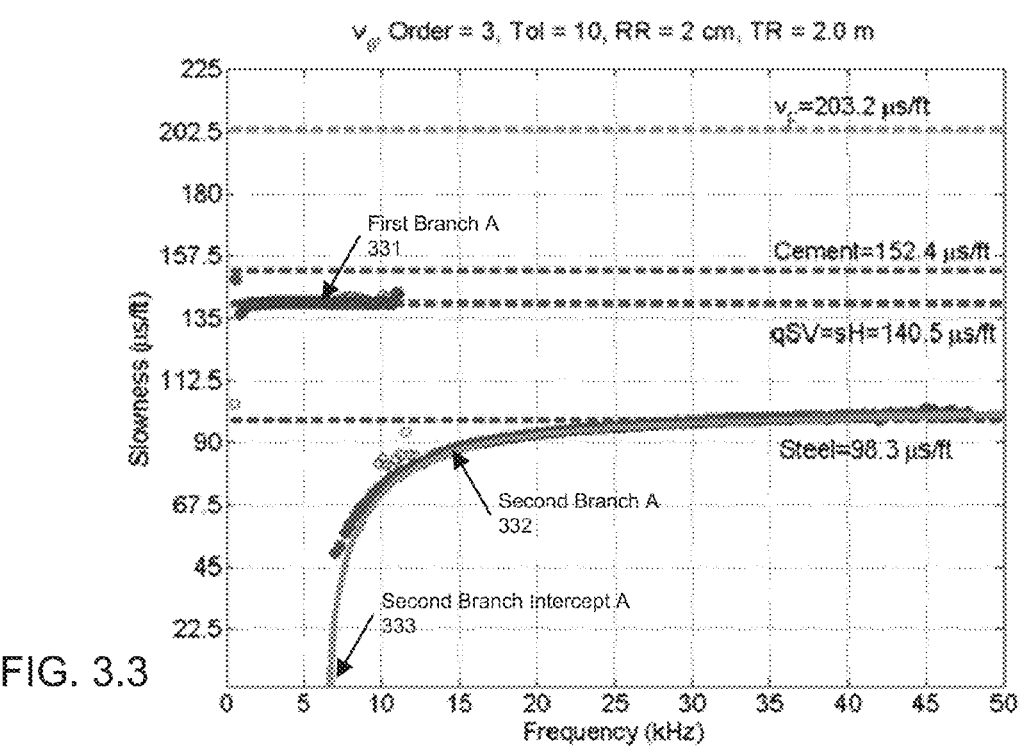
FIG. 3.3

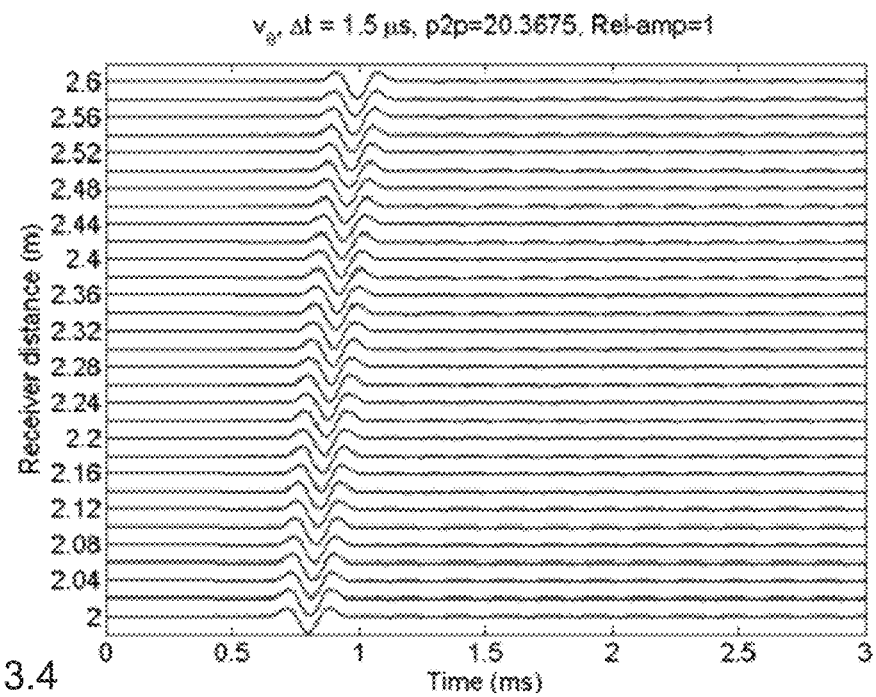
FIG. 3.4
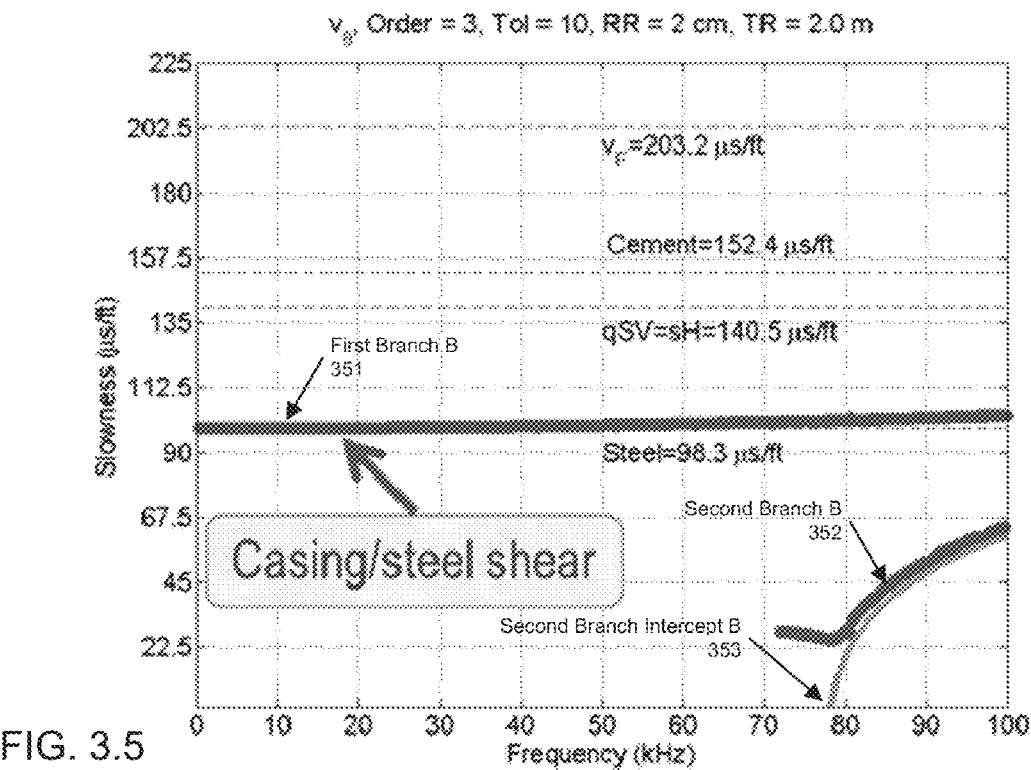
FIG. 3.5

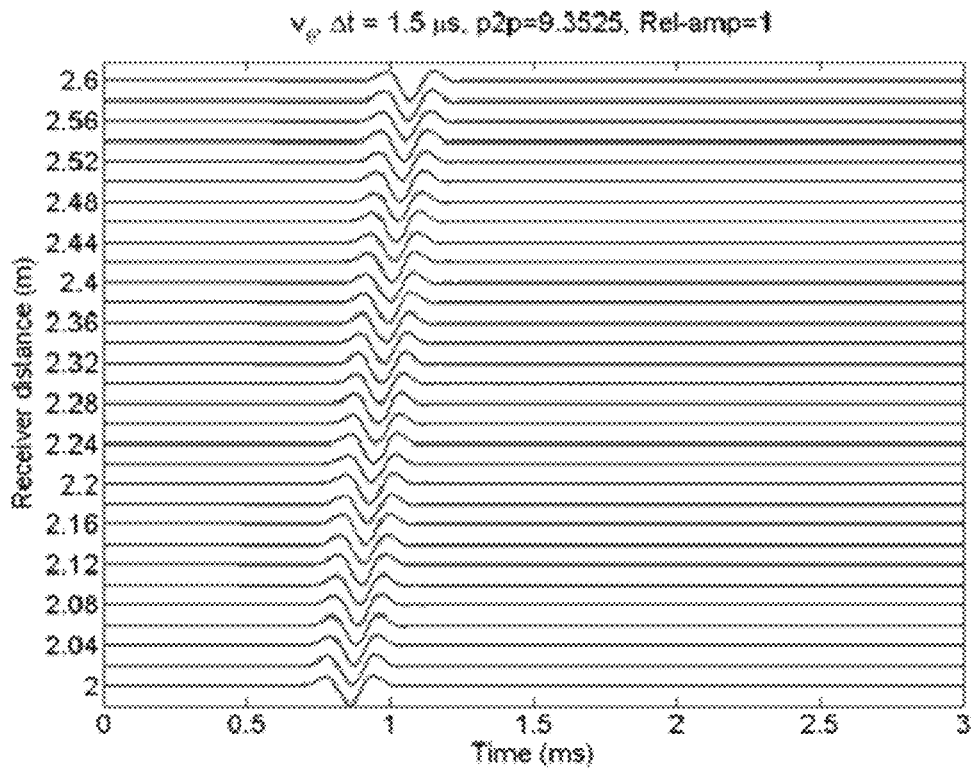
FIG. 3.6
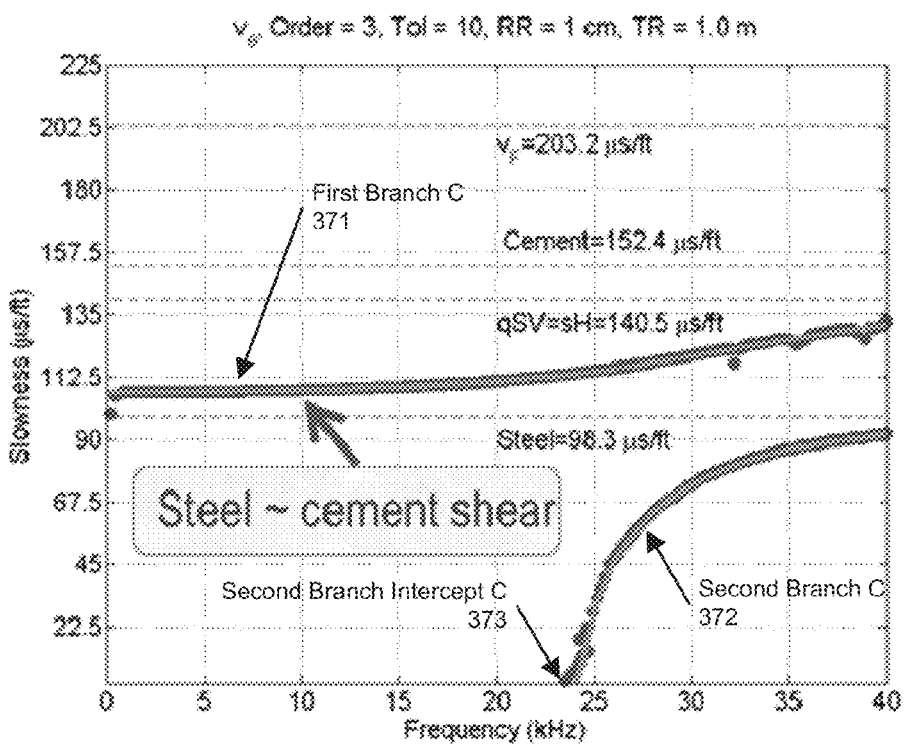
FIG. 3.7

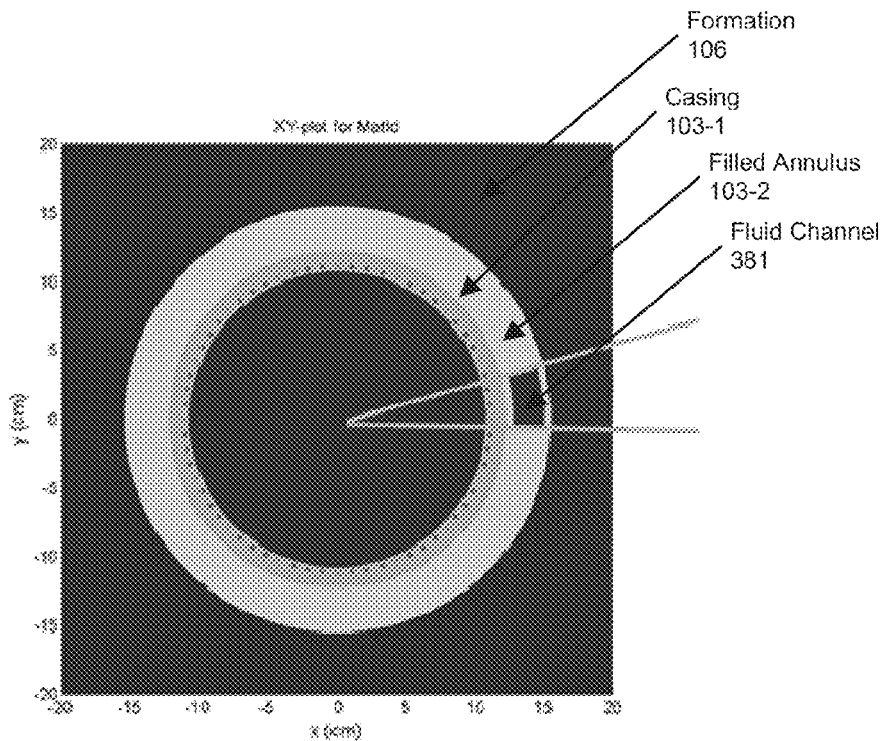
FIG. 3.8
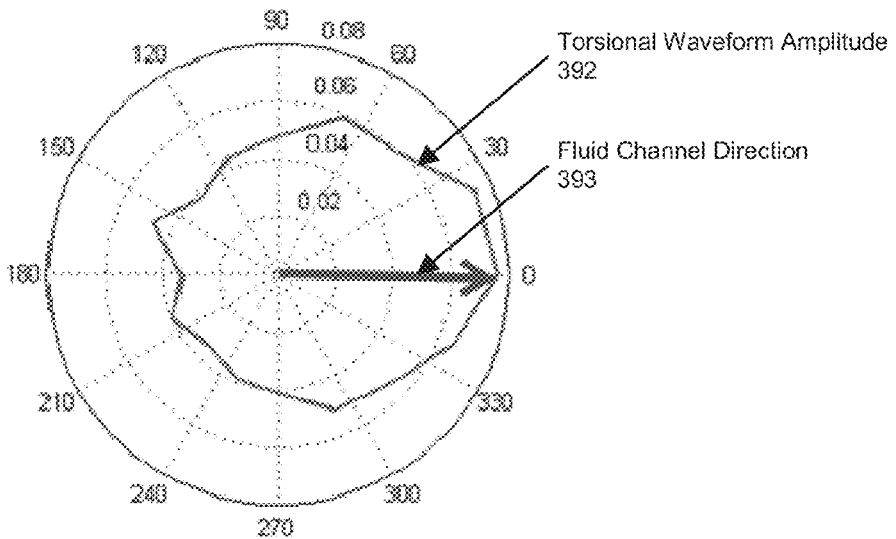
FIG. 3.9

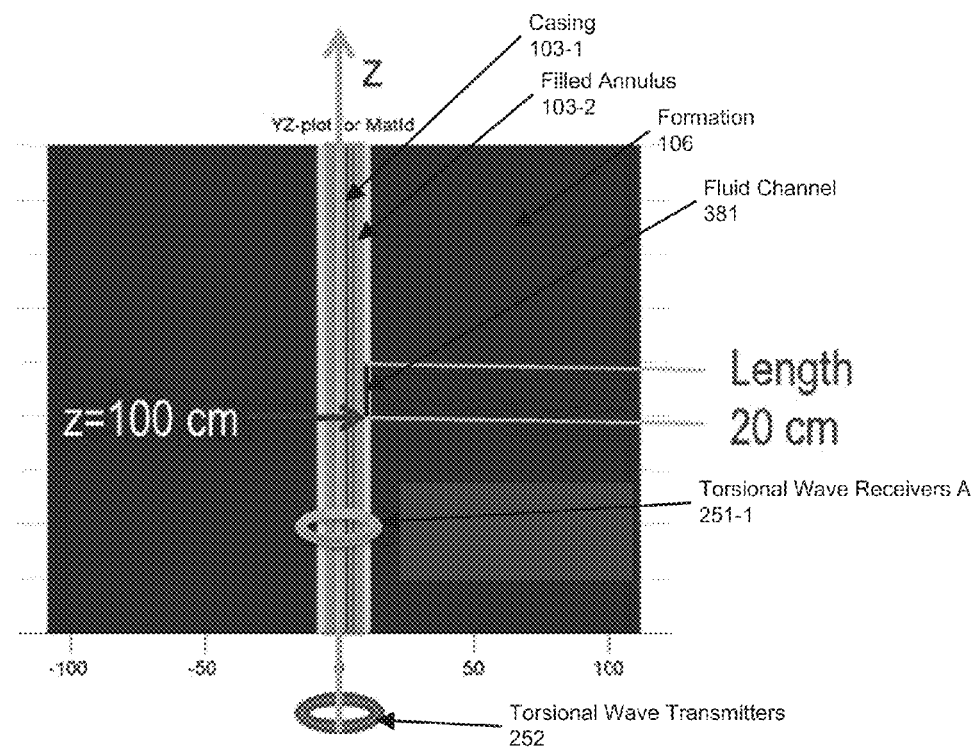
FIG. 3.10
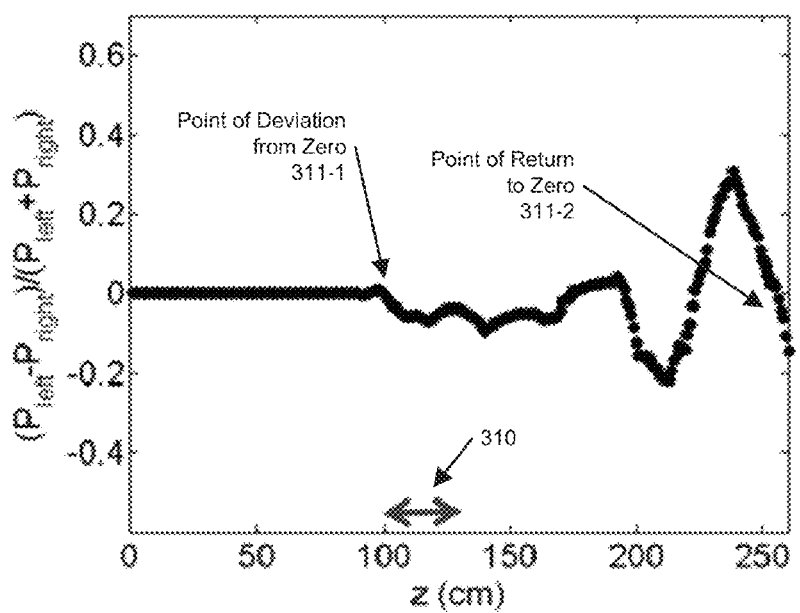
FIG. 3.11

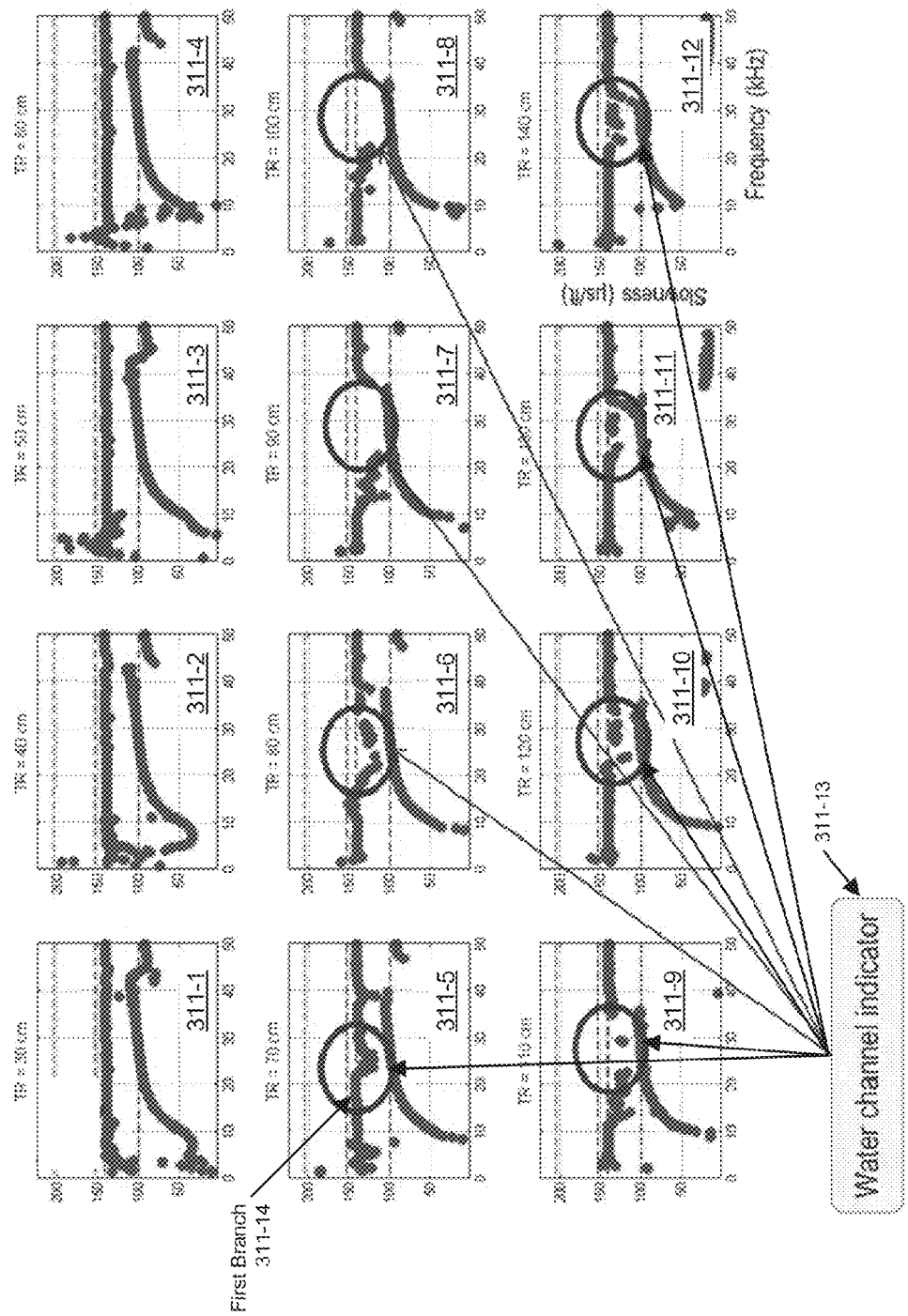
FIG. 3.12

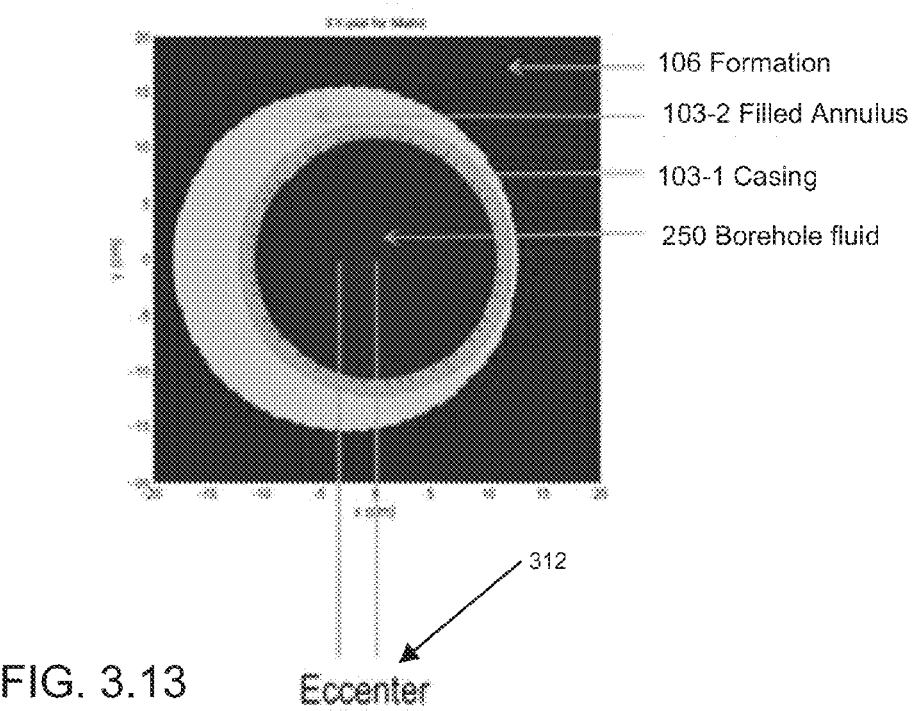
FIG. 3.13
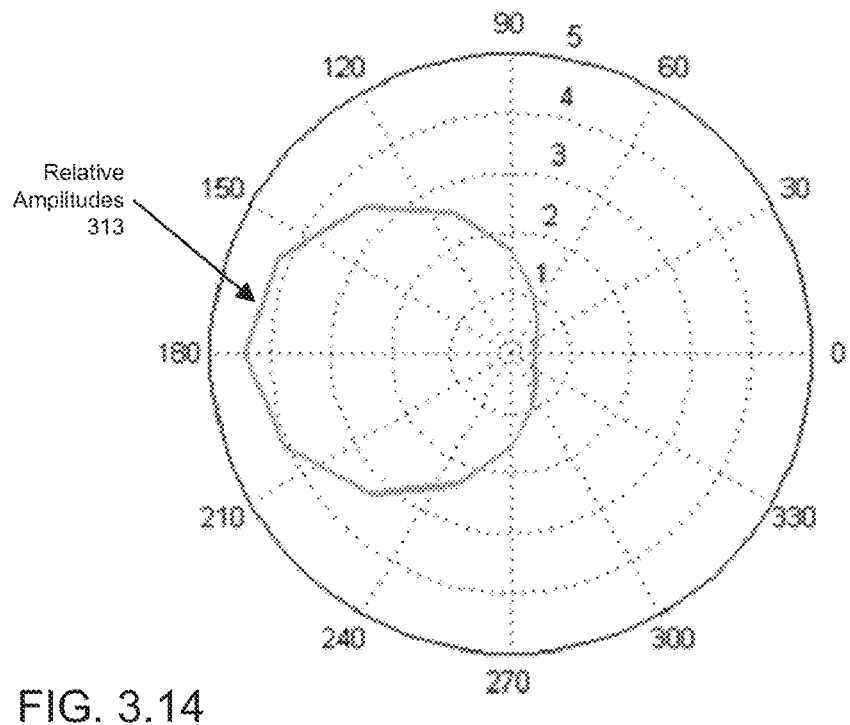
FIG. 3.14

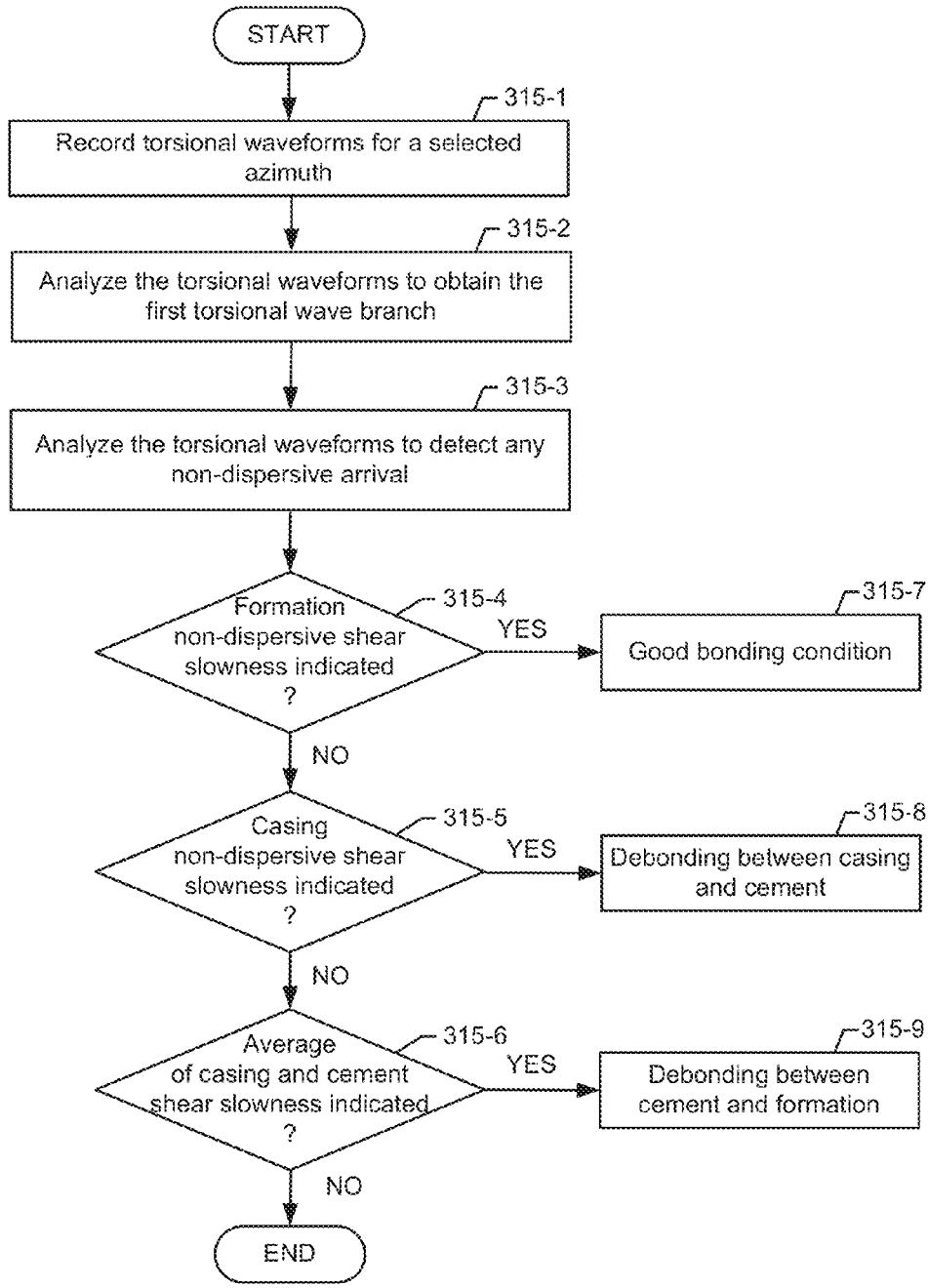
FIG. 3.15

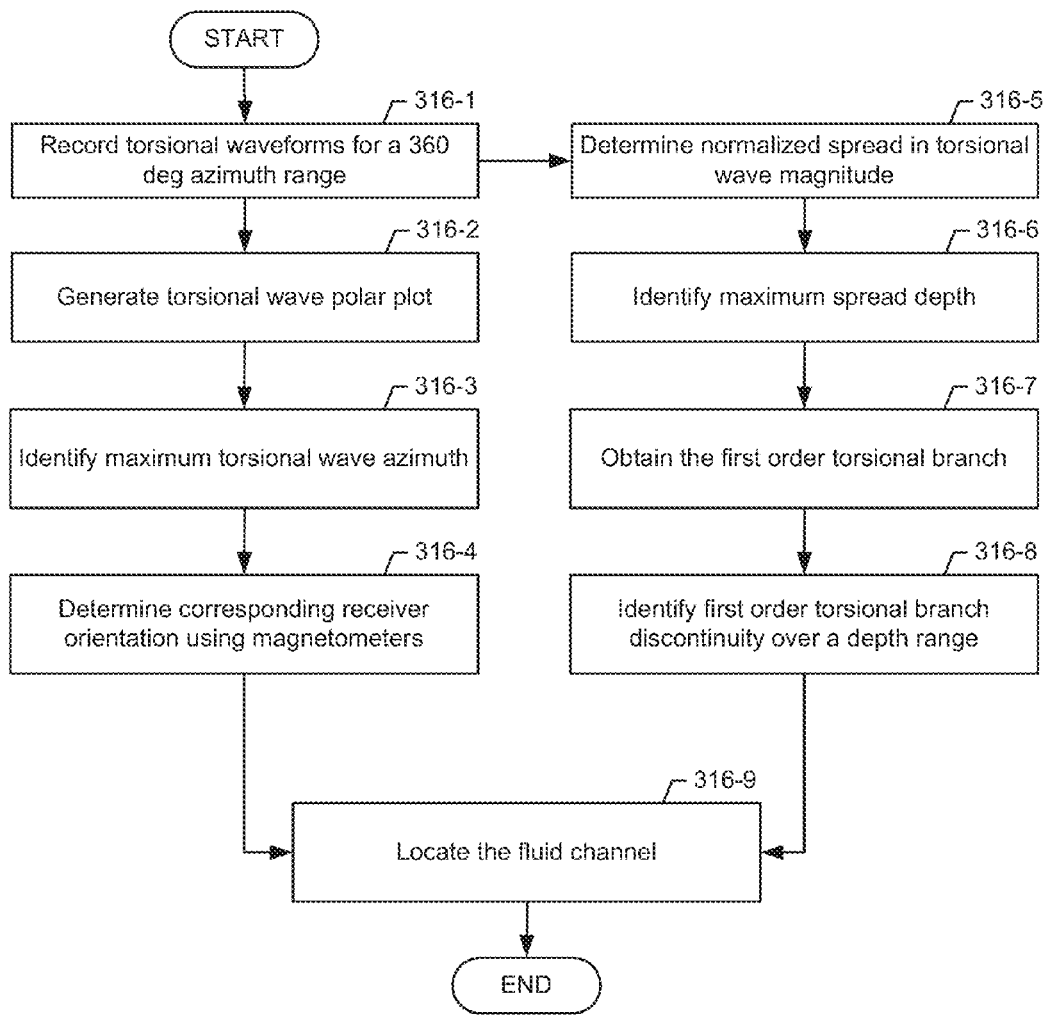
FIG. 3.16

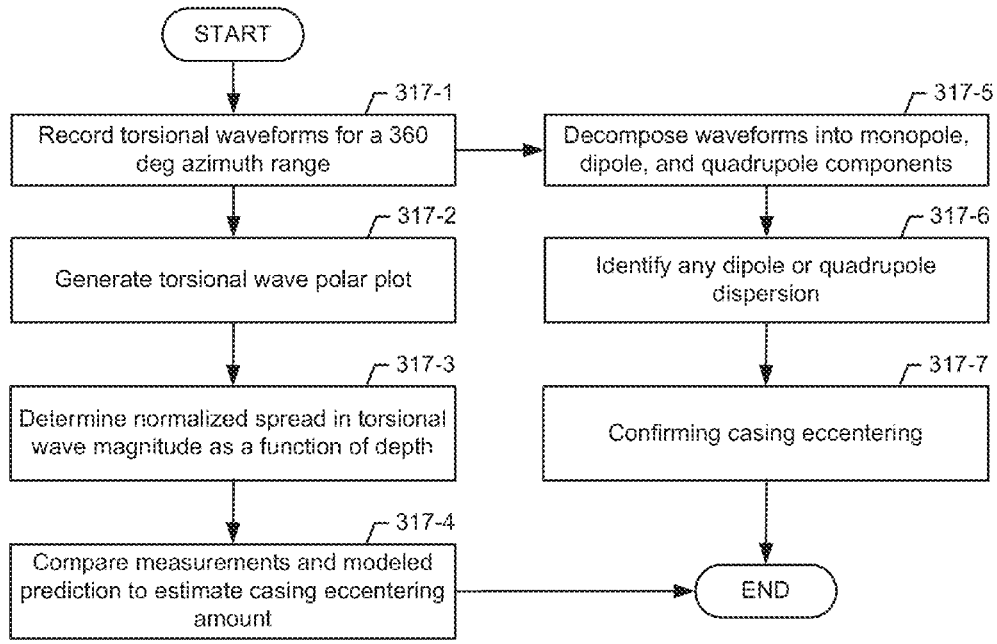
FIG. 3.17
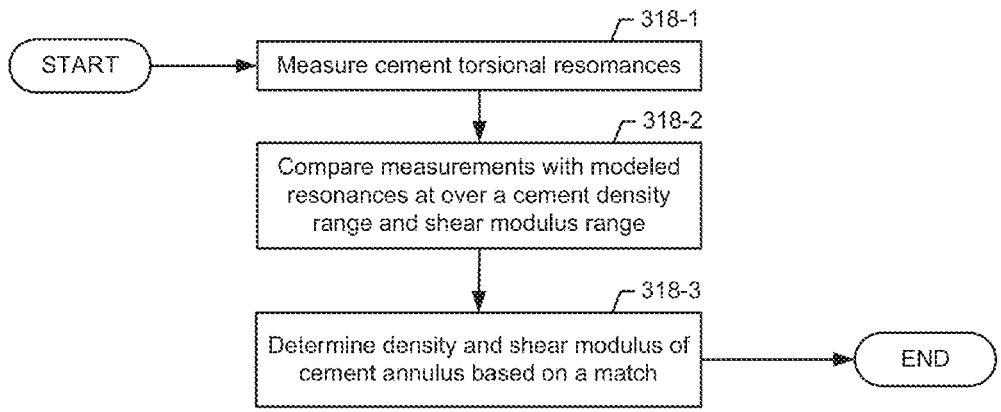
FIG. 3.18

TORSIONAL WAVE LOGGING

BACKGROUND

Operations, such as geophysical surveying, drilling, logging, well completion, hydraulic fracturing, steam injection, and production, are typically performed to locate and gather valuable subterranean assets, such as valuable fluids or minerals. The subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required to extract them. The terms may also refer to sites where substances are deposited or stored by injecting them into subterranean structures using boreholes and the operations associated with this process. Further, the term "field operation" refers to a field operation associated with a field, including activities related to field planning, drilling, completion, and/or production using the wellbore (also referred to as a borehole in this application).

SUMMARY

In general, in one aspect, embodiments of the invention relate to a method for torsional wave logging in a borehole of a subterranean formation. The method includes obtaining a torsional wave measurement of the borehole, wherein the torsional wave measurement represents characteristics of a torsional wave propagating within a cylindrical layered structure associated with the borehole, wherein the cylindrical layered structure comprises the subterranean formation and a completion of the borehole, analyzing, by a computer processor, the torsional wave measurement to generate a quality measure of the completion, and displaying the quality measure of the completion.

In general, in one aspect, embodiments of the invention relate to a system for torsional wave logging in a borehole of a subterranean formation. The system includes a sonic tool in the borehole comprising a torsional wave transmitter configured to generate a torsional wave propagating within a cylindrical layered structure associated with the borehole, wherein the cylindrical layered structure comprises the subterranean formation and a completion of the borehole, wherein the torsional wave transmitter is mounted on a first sliding pad in the borehole, and a torsional wave receiver configured to obtain a torsional wave measurement of the borehole, wherein the torsional wave receiver is mounted on a second sliding pad in the borehole, wherein the first sliding pad and the second sliding pad are at a pre-determined distance from each other and are in frictional coupling with an inside surface of the completion.

In general, in one aspect, embodiments of the invention relate to a non-transitory computer readable medium storing instructions for torsional wave logging in a borehole of a subterranean formation. The instructions, when executed, cause a computer processor to obtain a torsional wave measurement of the borehole, wherein the torsional wave measurement represents characteristics of a torsional wave propagating within a cylindrical layered structure associated with the borehole, wherein the cylindrical layered structure comprises the subterranean formation and a completion of the borehole, analyze the torsional wave measurement to generate a quality measure of the completion, and display the quality measure of the completion.

Other aspects of the invention will be apparent from the following detailed description and the appended claims.

BRIEF DESCRIPTION OF DRAWINGS

The appended drawings illustrate several embodiments of torsional wave logging and are not to be considered limiting of its scope, for torsional wave logging may admit to other equally effective embodiments.

FIG. 1.1 is a schematic view of a wellsite depicting a data logging operation in which one or more embodiments of torsional wave logging may be implemented.

FIG. 1.2 is a schematic diagram of a system used in torsional wave logging in accordance with one or more embodiments.

FIGS. 3.1-3.14 show an example of torsional wave logging in accordance with one or more embodiments.

FIGS. 3.15-3.18 show example workflows of torsional wave logging in accordance with one or more embodiments.

DETAILED DESCRIPTION

Figure 2:
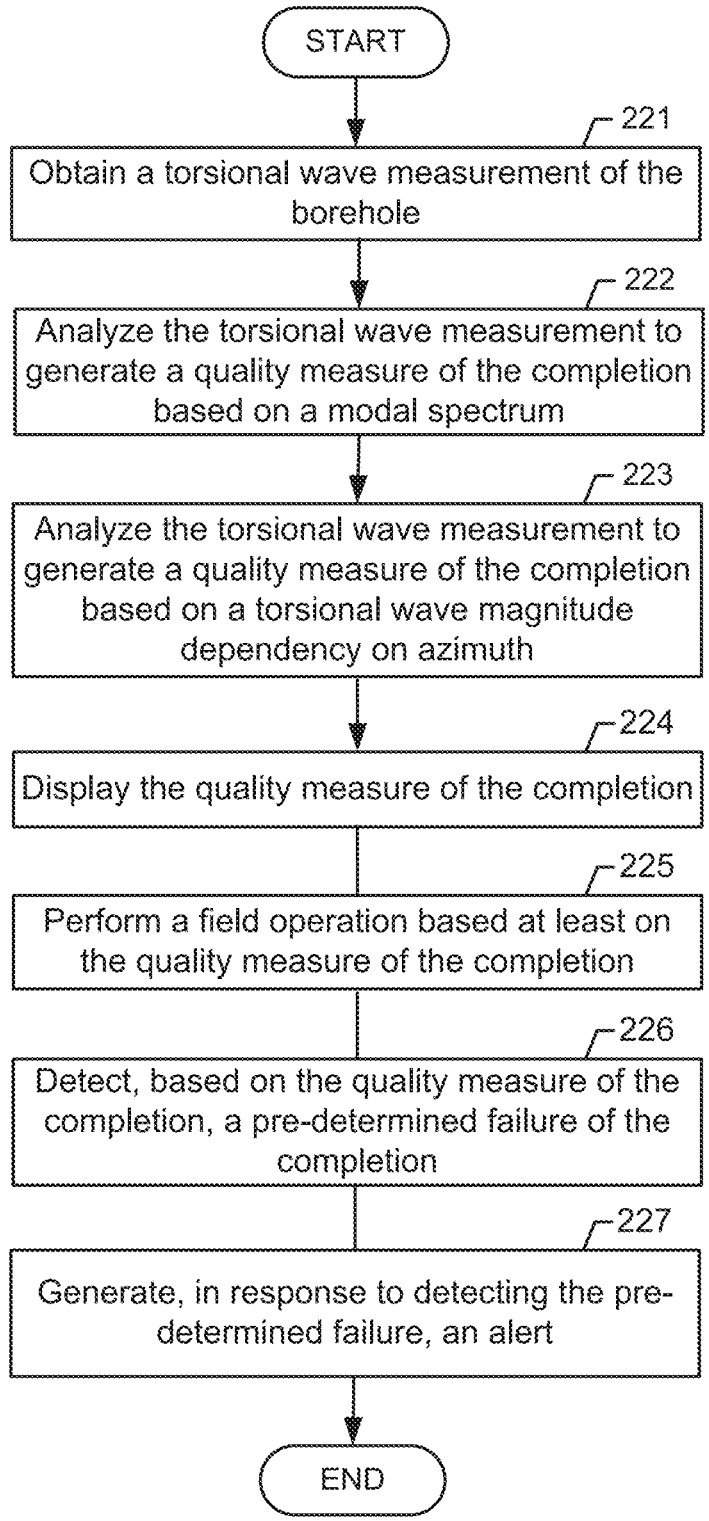
FIG. 2 shows an example flowchart of torsional wave logging in accordance with one or more embodiments.

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

Many boreholes are cased and cemented to provide hydraulic isolation between various zones of the penetrated formation, such as the hydrocarbon bearing layer (i.e., reservoir), cap rocks, aquifers, etc. Generally, the cased well, or cased borehole, includes an inner pipe referred to as a casing and a filled annulus between the casing and the formation. The casing and the filled annulus are collectively referred to as the completion. The casing is typically made of steel and the filled annulus is typically filled with cement. However, other materials may also be used for the casing and/or the filled annulus. Further, the casing may include one or more layers of concentric pipes, where the walls of inner and outer pipes may not be necessarily parallel, and the filled annulus may include one or more concentric layers of filled materials, including layers located between concentric pipes. Hydraulic isolation is achieved by ensuring (i) the filled annulus is made of a solid material that does not allow fluid to propagate through it, such as cement, and (ii) mechanical bonds between these various concentric layers (e.g., between the casing and filled annulus) as well as between the filled annulus and formation. Fluid channel(s) may be created at the boundaries between the various layers as a result of extremely poor bonding quality or in the filled annulus as a result of poor mechanical setting of the cement slurry (in the sense the cement does not become a solid) or cracking of a solid cement in the filled annulus due to surrounding formation stresses and/or casing expansion and contraction during well completion or/and production activities. In particular, hydraulic isolation requires the absence of any fluid channels in the filled annulus or at the boundaries of the various layers capable of allowing fluid movement from one formation depth to another. Compromising the hydraulic isolation may lead to the contamination of aquifers by production fluids, creating undesirable environmental problems. It may also lead to gas channeling through the fluid channel up the wellbore to the surface creating undesirable fire hazards. Fluid channels can also provide an undesirable path for the flowing hydrocarbon to move away from the producing well. A large amount of eccentering of the casing in the drilled borehole can compromise the setting of the cement slurry as a solid cement and hence compromise the strength of the filled annulus thus impairing the hydraulic isolation of all zones of the penetrated formation.

Throughout this disclosure, the terms "bonding quality" and "bonding condition" refer to a measure of disruption required to cause detachment among various concentric layers of the completion and/or detachment between the completion and the formation, and/or, in general, a disruption of the mechanical integrity of the filled annulus required to prevent fluids from traversing it. For example, high bonding quality, high quality bonding, good bonding condition, good condition bonding, etc., refers to the existence of solid layers in the filled annulus and strong attachment between these layers where a large disruption (e.g., external force) is required to cause any detachment and/or any breakup of the mechanical integrity of the layers. Hence, we may speak of strong attachment between the casing and penetrated formation provided by the filled annulus. In contrast, low bonding quality, low quality bonding, poor bonding condition, poor condition bonding, etc., refers to weak attachment between the casing and penetrated formation (e.g., resulting in a fluid channel created at the boundaries of the filled annulus with casing and/or with formation on the other side; and/or created within the filled annulus) or can occur under relatively small disruption.

Aspects of the present disclosure include a method, system and computer readable medium to perform torsional wave logging. Specifically, torsional wave logging explores the characteristic response of torsional waves recorded by a sonic tool in the borehole to investigate quality of a completion of the borehole. For example, completion quality may include (i) bonding quality (including presence of any fluid channel) between the concentric layers of the casing and of the filled annulus; as well as between the filled annulus and formation, and/or (ii) quality of the solidity of the fluid annulus in preventing fluid traversing it, and/or (iii) casing eccentricity. In one or more embodiments, the bonding quality, and/or filled annulus mechanical integrity quality, and/or casing eccentricity is determined by analyzing the torsional wave propagating in a cylindrical layered structure (i.e., casing, filled annulus and formation) of the completion and the associated modal spectrum. In one or more embodiments, an alert is generated in response to determining sub-optimal completion quality that may lead to un-acceptable stability of the borehole and/or escape of production and/or toxic fluids (containing hydrogen sulfide gas in certain locations) into layers of the earth surface where they could cause harmful environmental situations.

FIG. 1.1 depicts a schematic view, partially in cross section, of a field (100) in which one or more embodiments of torsional wave logging may be implemented. In one or more embodiments, one or more of the modules and elements shown in FIG. 1.1 may be omitted, repeated and/or substituted. Accordingly, embodiments of torsional wave logging should not be considered limited to the specific arrangements of modules shown in FIG. 1.1.

As shown in FIG. 1.1, the subterranean formation (106) includes several geological structures. As shown, the formation has a sandstone layer (106-1), a limestone layer (106-2), a shale layer (106-3), a sand layer (106-4), and a reservoir (106-6). A fault line (107) extends through the subterranean formation (106) intersecting these geological structures. Further, the fracture (106-5) may be a natural fracture or a hydraulically induced fracture. In one or more embodiments, various survey tools and/or data acquisition tools are adapted to measure the subterranean formation (106) and detect the characteristics of the geological structures of the subterranean formation (106).

As shown in FIG. 1.1, the wellsite (204) includes a rig (101), a borehole (103) and other wellsite equipment and is configured to perform wellbore operations, such as logging, drilling, fracturing, production, or other applicable operations. Generally, these operations performed at the wellsite (204) are referred to as field operations of the field (100). These field operations are typically performed as directed by the surface unit (202). In one or more embodiments, the borehole (103) is cased and includes a casing and filled annulus described above.

In one or more embodiments, the surface unit (202) is operatively coupled to the wellsite (204). In one or more embodiments, surface unit (202) may be located at the wellsite (204) and/or remote locations. The surface unit (202) may be provided with computer facilities for receiving, storing, processing, and/or analyzing data from data acquisition tools (e.g., logging equipment (109)) disposed in the borehole (103), or other part of the field (100). In one or more embodiments, the logging equipment (109)) is installed on a bottom hole assembly (BHA), or deployed through the internal opening of a BHA, or a wireline in the borehole (103). The surface unit (202) may also be provided with functionally for actuating mechanisms at the field (100). The surface unit (202) may then send command signals to these actuating mechanisms of the field (100) in response to data received, for example to control and/or optimize various field operations described above.

As noted above, the surface unit (202) is configured to communicate with data acquisition tools (e.g., logging equipment (109)) disposed throughout the field (100) and to receive data therefrom. In one or more embodiments, the data received by the surface unit (202) represents characteristics of the subterranean formation (106) and the borehole (103) and may include information related to porosity, saturation, permeability, stress magnitude and orientations, elastic properties, thermal properties, etc. These characteristics of the subterranean formation (106) and the borehole (103) are generally referred to as formation and/or borehole properties that are dependent on the type of rock material in various layers (106-1) through (106-4) of the subterranean formation (106); as well as the type of fluid within the borehole (103) and mechanical structures associated with the borehole (103). In one or more embodiments, the data may be received by the surface unit (202) during a drilling, casing, cementing, fracturing, logging, injection or production operation of the borehole (103). For example, data plot (108) may be a wireline log obtained during a wireline logging operation, logging-while-drilling (LWD) operation, or other types of logging operations. Generally, the data plot (108) is a measurement of a formation/borehole property as a function of depth taken by an electrically powered instrument to infer properties and make decisions about drilling, completion, and production operations. In one or more embodiments, the surface unit (202) is communicatively coupled to a torsional wave measurement tool (i.e., sonic tool (216)) embedded in the logging equipment (109).

In one or more embodiments, the surface unit (202) is communicatively coupled to a torsional wave analysis system (208). In one or more embodiments, the data received by the surface unit (202) may be sent to the torsional wave analysis system (208) for further analysis. In one or more embodiments, torsional wave analysis system (208) is configured to determine a bonding dependent parameter and/or casing eccentricity dependent parameter of the casing and filled annulus of the borehole (103) by analyzing a torsional wave dispersion measurement provided from the surface unit (202).

Typically, the field operations (e.g., logging, drilling, fracturing, injection, production or other applicable operations) are performed according to a field operation plan that is established prior to the field operations. The field operation plan typically sets forth equipment, pressures, trajectories and/or other parameters that define the operations performed for the wellsite. The field operation may then be performed according to the field operation plan. However, as information is gathered, the field operation may deviate from the field operation plan. Additionally, as drilling, casing, cementing, fracturing, injection, EOR, or other operations are performed, the subsurface conditions may change. An earth model may also be adjusted as new information is collected. Such information may include results generated by the torsional wave analysis system (208) that is used to identify appropriate changes to the field operation plan to address a new found event. For example, the fracturing, injection, EOR or other production plan may be adjusted based on a sub-optimal completion quality detected by the torsional wave analysis system (208).

FIG. 1.2 is a schematic diagram of a system (200) used in torsional wave logging in accordance with one or more embodiments. In one or more embodiments, one or more of the modules and elements shown in FIG. 1.2 may be omitted, repeated and/or substituted. Accordingly, embodiments of torsional wave logging should not be considered limited to the specific arrangements of modules shown in FIG. 1.2. As shown in FIG. 1.2, the system (200) includes details of the logging equipment (109) and the torsional wave analysis system (208) shown in FIG. 1.1. Specifically, the logging equipment (109) includes a sonic tool (216) among various logging devices. The torsional wave analysis system (208) includes a torsional wave analyzer (205) and data repository (210). In one or more embodiments, the data repository stores information used by the torsional wave analyzer (205), such as torsional wave measurement (212) and torsional wave modal spectrum (213). In one or more embodiments, the data repository (210) is any type of storage unit and/or device (e.g., a file system, database, collection of tables or any other storage mechanism) for storing data. Further, the data repository (210) may include multiple different storage units and/or devices. The multiple different storage units and/or devices may or may not be of the same type or located at the same physical site. For example, a portion of the data repository (210) may be located on the BHA (or wireline, or deployed through the internal opening of a BHA) with the logging equipment (109) while another portion may be located at the surface unit (202), which is omitted from the system (200) for clarity.

In one or more embodiments, the sonic tool (216) is configured to obtain a torsional wave measurement (212) of the borehole (103) shown in FIG. 1.1. In one or more embodiments, the sonic tool (216) includes torsional wave transmitters and receivers. In one or more embodiments, the borehole (103) is cased and has a completion, which typically includes cylindrical layers of casing and filled annulus adjoining the subterranean formation (106). In the cased borehole (103), the torsional wave transmitters and receivers are mounted on sliding pads that are in frictional coupling with the completion of the borehole (103). In one or more embodiments, the torsional wave transmitters and receivers are mounted on sliding pads in circular or ring configurations and are referred to as torsional wave ring source or torsional wave ring receivers. Accordingly, the torsional waves are generated in the casing to probe the bonding quality and mechanical properties of the adjoining filled annulus and the subterranean formation (106). Generally, torsional waves are not supported by inviscid fluids and cannot propagate across fluid annulus in the absence of shear coupling. Therefore, torsional wave logging is not affected by the presence of any sonic tool structure and the compressional velocity and mass density of the borehole fluid in the borehole (103). An example of the sonic tool (216) (in particular, the torsional wave ring receivers) and cylindrical layers of the borehole completion of the borehole (103) are described in reference to FIG. 3.1 below.

The particle motion associated with torsional waves in a cased-hole geometry of the borehole (103) is described by the following equations:

Steel casing $$u_\theta^{(1)} = A_1 J_1(\beta r) + A_2 Y_1(\beta r) \quad \beta = \sqrt{\frac{\rho_S \omega^2}{\mu_S} - k^2}$$

Cement $$u_\theta^{(2)} = B_1 J_1(\gamma r) + B_2 Y_1(\gamma r) \quad \gamma = \sqrt{\frac{\rho_C \omega^2}{\mu_C} - k^2}$$

Anisotropic formation $$u_\theta^{(3)} = C_1 H_1^{(1)}(\alpha r) \quad \alpha = \sqrt{\frac{\rho_B \omega^2}{c_{66}} - \frac{c_{44}}{c_{66}} k^2}$$

where $u_\theta$ is the circumferential component of particle displacement associated with the torsional wave propagation, the superscript (1), (2), and (3), respectively, denote solutions in the steel casing, cement annulus, and an anisotropic formation. The torsional wave solution $u_\theta(r,z,t)$ is a function of radial coordinate r, axial coordinate z and time t. The time dependence component $\exp(-i\omega t)$ is suppressed in these equations for clarity. In an isotropic formation, the shear modulus $C_{44}=C_{66}$. The shear modulus of the steel casing and cement annulus are given by $\mu_S$ and $\mu_C$, respectively. The mass density of the steel casing, cement annulus and formation, respectively, are denoted by $\rho_S$, $\rho_C$, and $\rho_B$. The axial wavenumber and frequency associated with torsional waves propagating along the axial direction z are given by k and $\omega$, respectively. $J_1(x)$ and $Y_1(x)$, respectively, are the Bessel functions of the first and second kinds; and $H_1(x)$ is the Hankel function of first kind associated with a time dependence of $\exp(-i\omega t)$. The coefficients $A_1$, $A_2$, $B_1$, $B_2$, and $C_1$, are calculated by satisfying appropriate boundary conditions at the steel casing/cement annulus and cement annulus/formation interfaces. In the instance where excellent bond is required at all interfaces, these boundary conditions require continuity of $u_\theta(+)=u_\theta(-)$, and shear stress $\tau_{r\theta}(+)=\tau_{r\theta}(-)$ at all interfaces. It is, thus, clear that torsional waves are influenced by only the circumferential component of particle displacement $u_\theta$ and shear stress $\tau_{r\theta}$. In addition, torsional wave propagation characteristics are dependent on the shear modulus and mass density of the propagating medium. Consequently, torsional wave logging can be used to infer bonding quality at the interfaces and estimate shear modulus and mass density of any of the cylindrical layers in the cased-hole geometry. The cylindrical layers in the cased-hole geometry are referred to as the cylindrical layered structure of the cased hole. Although these equations are based on a steel casing and cement annulus, the particle motion associated with torsional waves propagating via a completion with different materials than steel and cement may be also described by similar equations.

In one or more embodiments, the torsional wave measurement data generated by the transmitters and receivers of the sonic tool (216) represents characteristics of a torsional wave propagating within the aforementioned cylindrical layered structure associated with the borehole (103). Torsional waves in a cylindrical layered geometry are characterized by an axi-symmetric particle displacement $u_\theta(r,z,t)$. These waves in a cylindrical system can propagate from the transmitter to an array of receivers in the form of either non-dispersive or dispersive arrivals (also referred to as branches) belonging to the torsional mode family. Each of these torsional branches is associated with a characteristic relationship between its wave propagation velocity and frequency. Propagation characteristics of all of the these torsional branches belonging to the monopole torsional mode family are obtained from the solution of a boundary-value problem after satisfying the continuity conditions at cylindrical interfaces as described earlier. Some of these torsional branches of the torsional family are generated by the torsional wave transmitter and can be retrieved by the processing of recorded waveforms using a modified matrix pencil algorithm or a variation of Prony's algorithm. The torsional wave measurement data is provided to the torsional wave analysis system (208) and stored in the data repository (210) as the torsional wave measurement (212). In one or more embodiments, the torsional wave analysis system (208) includes the torsional wave analyzer (205) that is configured to analyze the torsional wave measurement (212) to generate a quality measure of the completion of the borehole (103). In one or more embodiments, analyzing the torsional wave measurement (212) to generate the quality measure of the completion is based on modal spectrums (e.g., modal spectrum (213)) derived from the torsional wave measurement (212). For example, the modal spectrum (213) may be a spectrum of slowness of a particular torsional wave mode as a function of the torsional wave frequency. Any cylindrical structure supports a set of propagating modes, such as the monopole torsional, monopole Stoneley, dipole flexural, quadrupole, or octupole modes, etc. Each of these modes comprises of multiple branches that represent different types of coherent pulses that can transport energy from a transmitter to an array of receivers. Recorded waveforms at an array of receivers can be processed to isolate certain branches of coherent modal arrivals (or energy pulses) with characteristic relationship between its slowness and frequency. In one or more embodiments, the quality measure may be represented as a numerical value (e.g., 0.1, 0.5, 5, 10, etc.), a percentage (e.g., 1%, 5%, 90%, etc.), a letter grade (e.g., grade A, grade C, high, low, good, poor, etc.), a color, (e.g., red, yellow, white, etc.), or any other suitable representation.

Additional details of the torsional wave measurement (212), modal spectrum (213), and analyzing the torsional wave measurement (212) and modal spectrum (213) to generate the completion quality measure are described in reference to the flowchart depicted in FIG. 2 and the example depicted in FIGS. 3.1-3.4 below.

In one or more embodiments, the completion quality of the borehole (103) is assessed by the following four factors:

(1) the quality of bonding between the casing and filled annulus; (2) the quality of bonding between the filled annulus and the subterranean formation (106); (3) the absence of any fluid channels in the filled annulus; and (4) minimal eccentricity of casing in the borehole (103) that may lead to impaired hydraulic isolation with respect to the producing layer and adjoining cap rock or acquifers. In other words, the quality measure of the completion represents one or more of the aforementioned four factors. Accordingly, a field operation may be performed based on the quality measure of the completion. In one or more embodiments, a logging, drilling, cementing, fracturing, production, completion repair, or other applicable operations associated with the borehole (103) may be performed based on the quality measure of the completion of the borehole (103). For example, the additional drilling below the section that has already been drilled, cased and cemented may be performed as planned when the completion quality measure indicates high quality of the completion. In contrast, the drilling operation may be halted when the completion quality measure indicates low quality of the completion. In another example, the fracturing and/or production operation may be performed as planned when the completion quality measure indicates high quality of the completion. In contrast, the fracturing and/or production operation may be halted when the completion quality measure indicates low quality of the completion. In yet another example, the completion repair may be performed when the completion quality measure indicates probable failure of the completion. In one or more embodiments, these various field operations are performed using various devices, actuating mechanisms described in reference to FIG. 1.1 above.

In one or more embodiments, the torsional wave analyzer (205) is further configured to detect, based on the quality measure of the completion, a pre-determined failure of the completion. For example, the completion failure may compromise the hydraulic isolation of the borehole (103) with respect to the producing layer and adjoining cap rocks or aquifers, which may lead to reduced production or escape of production and/or toxic fluids (containing hydrogen sulfide gas in certain locations) into layers of the earth surface where they could cause harmful environmental situations. In another example, the completion failure over time may result in mechanical instability of the borehole (103) leading to possible collapse of the borehole (103) and its surrounding formation as the case may occur when an aquifer hydraulically communicates, via the filled annulus, with, and over time dissolves, a thick salt body penetrated by the well. In response to detection of one or more of such completion failures, an alert is generated by the torsional wave analyzer (205). The aforementioned completion repair may be initiated in response to the alert.

Additional details of the torsional wave measurement (212), modal spectrum (213), and analyzing the torsional wave measurement (212) and modal spectrum (213) to detect completion failures are described in reference to the flowchart depicted in FIG. 2 and the example depicted in FIGS. 3.1-3.4 below.

FIG. 2 depicts an example flowchart of torsional wave logging in accordance with one or more embodiments. For example, the method depicted in FIG. 2 may be practiced using the torsional wave analysis system (208) described in reference to FIGS. 1.1 and 1.2 above. In one or more embodiments, one or more of the elements shown in FIG. 2 may be omitted, repeated and/or performed in a different order. Accordingly, embodiments of torsional wave logging should not be considered limited to the specific arrangements of elements shown in FIG. 2.

Examples of borehole sonic data acquisition modes includes (a) refracted monopole compressional and shear headwaves generated by a monopole transmitter, e.g., in the frequency range of 10 to 20 kHz; (b) axi-symmetric Stoneley mode with particle displacement components $u_r$ and $u_z$, generated by a monopole transmitter, e.g., in the frequency range of 0.2 to 10 kHz; (c) axi-symmetric torsional mode with particle displacement component $u_\theta$ generated by a unipolar torsional wave transmitter, e.g., in the frequency range of 1 to 50 kHz; (d) dipole flexural mode with particle displacement components $u_r$, $u_\theta$, and $u_z$ generated by a dipole transmitter, e.g., in the frequency range of 0.2 to 10 kHz, (e) monopole extensional mode with particle displacement components $u_r$ and $u_z$ generated by a monopole transmitter, e.g., in the frequency range of 1 to 50 kHz, and other multi-pole wave modes, such as quadrupole or octupole modes. Bonding failure (referred to as de-bonding) between the casing and filled annulus is associated with larger receiver wave amplitudes and relatively less attenuation between a given transmitter-to-receiver (T-R) spacing, whereas a high quality bonding is characterized by a smaller receiver wave amplitude associated with the radiation of extensional and flexural waves in the casing surrounding the logging equipment (109). Attenuation of both the extensional (mode (a) and mode (e)) and flexural (mode (d)) waves in a casing can be used to infer the quality of bond between the casing and filled annulus; as well as the filled annulus and formation. However, both the extensional and flexural waves in the casing are associated with a radial displacement component that has a tendency to couple acoustic and/or elastic disturbance to the adjoining cylindrical filled annulus or formation even in the presence of a micro-annulus of fluid at either of these two interfaces. In contrast, because torsional waves (mode (c)) are associated with only circumferential displacement component, using torsional waves to detect the presence of fluid annuli at either of the two interfaces decouples the motion in the casing from the filled annulus and formation even in the presence of a rather thin layer of fluid at the interface.

In one or more embodiments, the method depicted in FIG. 2 is practiced to perform torsional wave logging to generate a quality measure of the completion of the borehole. For example, the quality measure of the completion may represent bonding conditions of the cylindrical layered structure of the completion, presence of fluid channel in the cylindrical layered structure, and eccentricity of the cylindrical layered structure.

Initially in Element 221, a torsional wave measurement of the borehole is obtained. In one or more embodiments, the torsional wave measurement is obtained using the sonic tool described in reference to FIG. 1.2 above. Specifically, the torsional wave measurement represents characteristics of a torsional wave propagating within a cylindrical layered structure associated with the borehole, including the subterranean formation and layers of a completion of the borehole. In one or more embodiments, the completion layers include a casing and a filled annulus between the casing and the subterranean formation. In one or more embodiments, the casing and/or the filled annulus may each include multiple layers of different materials. As noted above, a common material used for casing is steel and a common material used for the filled annulus is cement.

In Element 222, the torsional wave measurement is analyzed to generate a quality measure of the completion based on a modal spectrum. In one or more embodiments, the torsional wave measurement is first analyzed to generate a modal spectrum, which is a spectrum of a parameter of the torsional wave as a function of a frequency of the torsional wave. For example, the modal spectrum may be one of several modal spectrums generated using a dispersion spectrum extraction algorithm known to those skilled in the art. In one or more embodiments, the modal spectrum is generated using a modified matrix pencil algorithm or some variations of the Prony's algorithm. In one or more embodiments, other dispersion spectrum extraction algorithm known to those skilled in the art may also be used. Generally, each of these modal spectrums corresponds to one of several wave modes of the torsional wave. In one or more embodiments, the torsional wave parameter of the modal spectrum exhibits completion quality dependent behaviors. For example, the magnitude, rate of change, intercept, inflection, maximum, minimum, etc. of the torsional wave parameter in the modal spectrum may be dependent on the completion quality. In one or more embodiments, the modal spectrum is generated based on the slowness parameter associated with the corresponding wave mode. As will be described later in the example depicted in FIGS. 3.1-3.14, the slowness associated with certain wave mode(s) exhibits particular completion quality dependent behaviors. In one or more embodiments, the modal spectrum is analyzed to generate the quality measure of the completion based on a pre-determined criterion specific to these completion quality dependent behaviors. Modal spectrums of different wave modes may be used in different embodiments. Further, quality measures generated from multiple modal spectrums based on different completion quality dependent behaviors may be combined to generate an aggregate quality measure of the completion.

In one or more embodiments, the quality measure of the completion identifies the bonding condition between the casing and the filled annulus, as well as between the filled annulus and the formation, as high quality when a low frequency slowness of the modal spectrum is within a pre-determined range of a far-field slowness of the formation.

In one or more embodiments, the quality measure of the completion identifies the bonding condition between the casing and the filled annulus as poor quality when the low frequency slowness of the modal spectrum is within a pre-determined range of casing material slowness of the casing.

In one or more embodiments, the quality measure of the completion identifies the bonding condition between the filled annulus and the formation as poor quality when the low frequency slowness of the modal spectrum is within a pre-determined range of a filling material slowness of the filled annulus.

In addition, non-propagating torsional-radial resonances can also be used to infer the bonding quality between layers of the cylindrical layered structure of the completion. Radial resonant frequencies change as a function of radial loading of the casing by the filled annulus and formation. In particular, the casing torsional-resonant frequency changes as a function of mechanical properties (e.g., compressional and shear velocities, mass density, etc.) of the filled annulus. Therefore, changes in the mechanical properties of the filled annulus caused by the presence of fluid channels can be inferred from the measured changes in the casing torsional-resonant frequency.

In one or more embodiments, the quality measure of the completion identifies the presence of fluid channel in the cylindrical layered structure of the completion when a discontinuity of the modal spectrum exceeds a pre-determined threshold.

In one or more embodiments, the quality measure of the completion identifies the bonding condition between the casing and the filled annulus, as well as between the filled annulus and the formation, as high quality when an intercept of the modal spectrum is within a pre-determined range of a resonance frequency of the formation.

In one or more embodiments, the quality measure of the completion identifies the bonding condition between the casing and the filled annulus as poor quality when the intercept of the modal spectrum is within a pre-determined range of a slowness of the resonance frequency of the casing.

In one or more embodiments, the quality measure of the completion identifies the bonding condition between the filled annulus and the formation as poor quality when the intercept of the modal spectrum is within a pre-determined range of the resonance frequency of the filled annulus.

Additional details of generating the quality measure of the completion based on completion quality dependent behaviors of a modal spectrum are described in reference to FIGS. 3.1-3.4 below.

In Element 223, the torsional wave measurement is analyzed to generate a quality measure of the completion based on a torsional wave magnitude (or amplitude) dependency on azimuth. In one or more embodiments, the torsional wave measurement is obtained using a torsional wave ring receiver having individual receivers arranged in a ring configuration. In one or more embodiments, the torsional wave measurement includes multiple waveforms measured by these torsional wave ring receivers. These waveforms are analyzed to generate a torsional wave magnitude (or amplitude) plot in a polar coordinate system based on the azimuth of each of the torsional wave ring receivers in the ring configuration. In one or more embodiments, the torsional wave magnitude (or amplitude) plot is used to evaluate variations of the torsional wave magnitude (or amplitude) over a pre-determined azimuth range. Strong azimuth dependency of the torsional wave magnitude (or amplitude) may be induced by presence of a fluid channel at a particular azimuth or an eccentricity of the casing toward a particular azimuth in the borehole. One way to differentiate between these two scenarios is based on torsional wave magnitudes exhibited in multi-pole wave-analysis together with the identification of families of orthogonal modes, such as the dipole flexural, and quadrupole modes, etc., generated by a torsional wave transmitter in the presence of eccentering of steel casing in a borehole. In particular, torsional wave magnitudes in a multi-pole wave analysis would produce negligibly small amplitudes of the higher-order dipole flexural and/or quadrupole modes for well aligned and concentric cylindrical layered structure of the completion. Said in other words, excitation of only torsional wave magnitudes (or amplitudes) by a torsional wave transmitter in a multi-pole wave-analysis implies negligible eccentricity of the casing in the borehole.

In one or more embodiments, the quality measure of the completion identifies presence of fluid channel in the cylindrical layered structure of the completion when (a) variations of the torsional wave magnitude over a pre-determined azimuth range as reflected in the torsional wave magnitude plot exceeds a pre-determined level, and (b) the torsional wave magnitudes for any higher-order modes than the monopole torsional mode in a multi-pole wave analysis of the torsional wave are less than a pre-determined threshold.

In one or more embodiments, the quality measure of the completion identifies eccentricity between the casing and the borehole when (a) variations of the torsional wave magnitude over a pre-determined azimuth range as reflected in the torsional wave magnitude plot exceeds a pre-determined level, and (b) the torsional wave magnitudes for at least one of the higher-order modes than the monopole torsional mode in a multi-pole wave mode of the torsional wave exceeds a pre-determined threshold.

Additional details of generating the quality measure of the completion based on the torsional wave magnitude dependency on azimuth are described in reference to FIGS. 3.1-3.4 below.

In Element 224, the quality measure of the completion is displayed. For example, one or more of graphical representations of bonding quality between the casing and filled annulus, bonding quality between the filled annulus and formation, bonding quality of any other adjacent layers in the cylindrical layered structure of the completion, presence or absence of any fluid channel, and eccentricity of the casing in the borehole may be displayed to a user. The quality measure may be displayed as a numerical value (e.g., 0.1, 0.5, 5, 10, etc.), a percentage (e.g., 1%, 5%, 90%, etc.), a letter grade (e.g., grade A, grade C, high, low, good, poor, etc.), a color, (e.g., red, yellow, white, etc.), or other suitable representation. In one or more embodiments, the quality measure of the completion is displayed at multiple selected depths of the borehole. In one or more embodiments, the quality measure of the completion is displayed over a range of the borehole depth.

In Element 225, a field operation is performed based at least on the quality measure of the completion. For example, one or more of a logging, drilling, fracturing, production, completion repair or other applicable operations associated with the borehole may be performed based on the quality measure of the completion. The drilling of deeper sections, and/or fracturing and/or production operation for a well completely drilled and completed may be performed as planned when the completion quality measure indicates high quality of the completion. In contrast, the drilling of deeper sections, and/or the fracturing and/or production operation for a well completely drilled and completed may be halted when the completion quality measure indicates low quality of the completion. In another example, the completion repair may be performed when the completion quality measure indicates probable failure of the completion. A completion repair can take the form of deploying a system inside the cased well to squeeze through perforations in the casing adequate amounts of cement slurry into the filled annulus to fill in fluid channels and/or voids and/or cracks that are believed to be responsible for the failure of the completion.

In Element 226, a pre-determined failure of the completion is detected based on the quality measure of the completion. For example, the completion failure may result in mechanical instability of the borehole leading to possible collapse of the borehole. In another example, the completion failure may compromise the hydraulic isolation of the borehole with respect to the producing layer and adjoining cap rocks or aquifers, which may lead to reduced production or escape of production and/or toxic fluids (e.g., hydrogen sulfide gas) into the earth formation or to the well surface.

In Element 227, in response to detecting the pre-determined failure, an alert is generated, for example to initiate a completion repair or to halt a drilling further deep and/or production operation.

FIGS. 3.1-3.4 show an example of torsional wave logging in accordance with one or more embodiments. In one or more embodiments, one or more of the modules and elements shown in FIGS. 3.1-3.4 may be omitted, repeated and/or substituted. Accordingly, embodiments of torsional wave logging should not be considered limited to the specific arrangements of modules shown in FIGS. 3.1-3.4.

As noted above, certain features of torsional waves in cased-holes are used to identify fluid-filled volume (e.g., a channel due to partial debonding, or an entire annulus due to severe debonding) between steel and cement, or cement and formation interfaces. Torsional wave transducers mounted on pads pushed against the steel casing in a cased-hole generate torsional waveforms that are recorded at an array of receivers also mounted on pads in contact with the steel casing. Torsional waves in such cylindrical layered structures are characterized by a dominant particle motion in the circumferential direction and associated shear stress in the cross-sectional plane. These waves are not supported by inviscid fluids and cannot propagate across a fluid annulus in the absence of shear coupling. Torsional waves are, therefore, decoupled from the adjoining cylindrical layers in the absence of any shear coupling as is the case in the presence of fluid annulus between the steel casing and cement annulus, or cement annulus and formation. Cylindrical layered structures can support a number of modes, such as the monopole Stoneley, monopole torsional, dipole flexural and quadrupole, etc. Each of these families of modes comprises of several branches that transport elastic energy in the form of coherent pulses from the transmitter to an array of receivers. Any coherent arrival at an array of receivers is referred to as a propagating branch from one of the propagating mode families. To detect the presence of such fluid annuli at any of these two interfaces, these waveforms are processed to isolate both non-dispersive and dispersive torsional arrivals (i.e., coherent pulses of elastic wave energy generated by a torsional wave transmitter and recorded at an array of receivers) supported by such a combination of cylindrical layers. The presence of a fluid layer at the steel casing and cement annulus decouples the steel casing from the adjoining cement and formation in the sense the torsional energy propagating in the steel casing does not couple to the adjoining cement and formation. Consequently, as will be described in the following example FIGS. 3.2-3.7, the detection of a strong steel casing torsional shear arrival is an indicator of debonding between the steel casing and cement annulus. In contrast, when the casing and cement annulus are well-bonded, and there is a fluid annulus between the cement annulus and formation, the lowest torsional branch asymptotes to an average value of steel and cement shear slownesses. When both the second and third interfaces are well-bonded, the lowest branch of torsional modes at low frequencies yields the far-field formation shear slowness.

In additional to detecting bonding conditions at the interfaces between cylindrical layered structure of the completion, torsional wave logging is also used to detect the presence of fluid-channels in the cement annulus itself. This is accomplished by monitoring of torsional wave amplitudes at azimuthally deployed receivers mounted on a padded ring in contact with the steel casing. Torsional waves at receivers closest to the fluid channel exhibit the largest amplitude. Locating the receiver pad azimuth from the North with a magnetometer or a tool orientation measurement system identifies the location of fluid channels in the cement annulus.

Further, relative differences among torsional wave amplitudes at azimuthally deployed torsional wave receivers at a given axial position can be used to estimate eccentricity of the steel casing in a borehole. Eccentricity of the steel casing is also manifested by the generation of extensional, dipole flexural and quadrupole modes, in addition to the generation of the monopole torsional mode of the steel casing generated by a torsional wave transmitter.

FIG. 3.1 shows an example of the sonic tool (216) depicted in FIG. 1.2. As shown in the cross-sectional view (310-1), the sonic tool (216) is suspended by the wireline (252) in the borehole (103), which is a cased borehole (103) penetrating the formation (106) and filled with borehole fluid (250). The completion of the borehole (103) includes the casing (103-1) and filled annulus (103-2). As shown in FIG. 3.1, the casing (103-1), filled annulus (103-2), and formation (106) are associated with radii "a," "b" and "c," respectively to form a cylindrical layered structure. Although the cross-sectional view (310-1) shows borehole fluid (250) in the borehole (103), torsional wave logging described in the following example FIGS. 3.1-3.14 may also be performed without any borehole fluid in the borehole (103).

The sonic tool (216) includes torsional wave transmitters (252) that are mounted on a sliding pad in a ring configuration. The torsional wave transmitters (252) may include unipolar torsional wave transducers. The sliding pad is in frictional coupling with the casing (103-1). In an example configuration, the torsional wave transmitters (252) are mounted on segmented sliding pads that can be pushed against the inner surface of the casing (103-1) to provide frictional coupling between the torsional motion in the torsional wave transmitters (252) and the casing (103-1). The sliding pad length, width and thickness, together with the choice of its material are selected to provide adequate transduction efficiency that enables torsional waves in the casing (103-1) to propagate more than at least two meters along the borehole axis. An example design of the torsional wave transmitters (252) using either a piezocomposite or magnetostrictive material uses standard impedance matching layer in the form of pads between the transducer material and casing (103-1) to provide an efficiency larger than 30%.

The sonic tool (216) also includes an additional array of sliding pads at an axial distance range $Z_1$ through $Z_n$ from the torsional wave transmitters (252). Each sliding pad in this array is also in frictional coupling with the casing (103-1) and is mounted with torsional wave receivers in a ring configuration. The torsional wave receivers (e.g., torsional wave receivers A (251-1), torsional wave receivers M (251-m)) on each sliding pad may include circumferential geophone sensors. Although eight receiver-mounted-pads are shown as an example, any number of receiver-mounted-pads may be included in the array.

The cross-sectional view (310-2) shows an example of the torsional wave receivers (251-1) mounted on segmented steel pads that are pushed against the casing (103-1) by hydraulic pumps to provide shear or frictional coupling between the torsional wave receivers (251-1) and the casing (103-1). Although the radii "a," "b" and "c" are shown as 7 cm, 9 cm, and 11 cm, respectively, smaller or larger radii may also be used. For example, casings (103-1) of outer diameter ranging from 5 inches to 25 inches can also be used. Although eight individual receivers are shown as an example, any number of receivers may be included in the torsional wave receivers (251-1).

The following example Figures are based on one or more variations of the schematic diagram shown in FIG. 3.1.

FIG. 3.2 shows torsional waveforms recorded by individual geophone receivers at a selected azimuth across the array of pads shown in FIG. 3.1. The first receiver is located at 2 m and the last receiver is located at 2.6 m from the torsional wave transmitters (252). These waveforms are simulated results based on good bonds at both the interfaces between the steel casing and cement annulus and the cement and formation. The receiver mounted pads used in the simulation are increased from 8 pads, as shown in FIG. 3.1 to 16 pads.

FIG. 3.3 shows modal spectrum generated by analyzing the recorded torsional waveforms shown in FIG. 3.2 using a matrix pencil algorithm or a modified matrix pencil algorithm known to those skilled in the art. The modal spectrum includes the first branch A (331) and the second branch A (332) corresponding to the torsional mode family for the cylindrical layered structure shown in FIG. 3.1. The first branch A (331) shows the non-dispersive torsional shear slowness of approximately 140.5 µs/ft, which is the far-field formation slowness. This modal spectrum behavior is an indicator of good bond at both the interfaces between the steel casing and cement annulus; and the cement and formation. The second branch A (332) shows the second branch intercept A (333) of approximately 7 kHz. This is the resonance frequency associated with the formation (106) for the cylindrical layered structure shown in FIG. 3.1. This modal spectrum behavior is also an indicator of good bonds at both the interfaces between the steel casing and cement annulus and the cement and formation.

FIG. 3.4 shows torsional waveforms similar to those shown in FIG. 3.2. The waveforms shown in FIG. 3.4 are simulated results based on poor bonding between the steel casing and cement annulus and good bonding between the cement and formation.

FIG. 3.5 shows modal spectrums generated by analyzing the recorded torsional waveforms shown in FIG. 3.4 using a modified matrix pencil algorithm. The modal spectrums includes the first branch B (351) and the second branch B (352) corresponding to the torsional mode family for the cylindrical layered structure shown in FIG. 3.1. The first branch B (351) shows the nearly non-dispersive torsional shear slowness of approximately 98.3 us/ft, which is the shear slowness of steel. The second branch B (352) shows the second branch intercept B (353) of approximately 78 kHz. This is the resonance frequency associated with the casing (103-1) for the cylindrical layered structure shown in FIG. 3.1. Either of these modal spectrum behaviors, or their combination, is an indicator of poor bonding between the steel casing and cement annulus and good bonding between the cement and formation.

FIG. 3.6 shows torsional waveforms similar to those shown in FIGS. 3.2 and 3.4. The waveforms shown in FIG. 3.6 are simulated results based on good bonding between the steel casing and cement annulus and poor bonding between the cement and formation.

FIG. 3.7 shows modal spectrum generated by analyzing the recorded torsional waveforms shown in FIG. 3.6 using a modified matrix pencil algorithm. The modal spectrum includes the first branch C (371) and the second branch C (372) corresponding to the torsional mode family for the cylindrical layered structure shown in FIG. 3.1. The first branch C (371) shows the slightly non-dispersive torsional shear slowness of approximately 112.5 us/ft, which represents a weighted average of steel and cement shear slownesses as it is in-between the shear slowness 98.3 us/ft, for the steel casing (103-1) and the shear slowness 152.4 us/ft, for the cement annulus (103-2). The second branch C (372)) shows the second branch intercept C (373) of approximately 24 kHz. This is the resonance frequency associated with the cement annulus (103-2) for the cylindrical layered structure shown in FIG. 3.1. Either of these modal spectrum behaviors, or their combination, is an indicator of good bonding between the steel casing and cement annulus and poor bonding between the cement and formation.

FIG. 3.8 shows a cross-sectional view of the cased-hole geometry shown in FIG. 3.1 with a fluid channel (381) of width 2.1 cm in the filled annulus (103-2). The fluid channel (381) is located facing a torsional wave receiver at an azimuth of 0 degree.

FIG. 3.9 shows a polar diagram of torsional wave amplitude (392) recorded at azimuthal receivers at an axial distance z=250 cm from the torsional wave transmitters. Notice that the amplitude is largest at an azimuth of 0 degree and minimum at an azimuth of 180 degrees. This torsional wave dependency on azimuth is an indicator of the fluid channel direction (393) along the 0 degree azimuth.

FIG. 3.10 shows a cross-sectional view of a cased-hole geometry shown in FIG. 3.1 with a fluid channel of width 2.1 cm and axial length of 20 cm located at a distance of z=100 cm from the torsional wave transmitter.

FIG. 3.11 shows a plot of normalized differences between the maximum ($P_{right}$) and minimum ($P_{left}$) torsional wave amplitudes as a function of axial distance from the torsional wave transmitters. While the fluid channel (381) corresponds to the range (310) in this plot, the point of deviation from zero (311-1) and the point of return to zero (311-2) provide an indicator and estimated range of the presence of fluid channel (381).

FIG. 3.12 shows modal spectrum plots (311-1) through (311-12) corresponding to transmitter-to-receiver distance (TR) ranging from 30 cm to 140 cm. Throughout these spectrum plots, the receiver has an aperture of length 30 cm and approaches a water channel located through the axial distance range of 100 to 120 cm from a stationery torsional wave transmitter. As shown in the modal spectrum plots (311-5) through (311-12), the first branch (e.g., first branch (311-14)) exhibits a discontinuity labeled the water channel indicator (311-13) in the frequency band of 20 kHz to 30 kHz. This discontinuity in the lowest order modal spectrum (i.e., the first branch) is an indicator of the presence of fluid channels in the cement annulus. It should be noted that the transmitter-receiver and/or axial range distances referred to here will change as a function of casing diameter and hole diameter, increasing with increases in these latter parameters.

FIG. 3.13 shows a misaligned variation of the cased borehole geometry depicted in FIG. 3.1. As shown in FIG. 3.13, an eccentered casing (103-1) enclosing the borehole fluid (250) is misaligned with respect to the filled annulus (103-2) with by an amount labeled eccenter (312).

FIG. 3.14 shows a polar diagram of relative amplitudes (313) of torsional waves recorded at azimuthal receivers at a chosen axial position. Notice that the torsional wave amplitude is smallest at an azimuth of 0 degree and largest at an azimuth of 180 degrees that is farthest from the borehole surface (i.e., the interface between the filled annulus (103-2) and formation (106)).

The polar diagram shown in FIG. 3.9 and FIG. 3.14 both exhibit azimuth dependency of the torsional wave magnitude. However, the presence of a fluid channel and the eccentricity of casing are differentiated based on one or more of the following factors: (a) monopole torsional modes generated by a torsional wave transmitter mounted on an eccentered steel casing in a borehole are relatively weaker than those generated in a concentrically placed steel casing in a borehole, (b) dipole flexural modes, quadrupole modes, and/or other multiple pole wave modes are generated by a torsional wave transmitter mounted on an eccentered steel casing in a borehole, but are not generated in a concentrically placed steel casing in a borehole, and (c) cement annulus resonances are sensitive to changes in the effective shear modulus and mass density of cement that are affected by the presence of fluid channels in the cement annulus. In one or more embodiments, the polar diagram is interpreted by a user based on these factors to make a decision on whether a fluid channel and/or casing eccentricity exists in the wellbore under investigation.

As illustrated in the example shown in the above example FIGS. 3.1-3.14, torsional wave logging in cased-holes can provide reliable assessment of the bond quality between the casing and cement annulus, as well as between the cement annulus and formation. Azimuthal distribution of torsional wave amplitudes at azimuthal receivers at a given axial station mounted on the steel casing can also help to detect and identify the location of fluid channels. Torsional wave amplitudes are larger at azimuthal receivers close to fluid channels than those far away from them. In contrast, torsional wave amplitudes are smaller at azimuthal receivers close to the borehole surface in the presence of eccentered steel casing in a borehole. In addition, eccentering of steel casing in a borehole causes generation of dipole flexural and quadrupole modes of the steel casing by a torsional wave transmitter mounted on the inner surface of steel casing. In addition, changes in the cement torsional wave resonances can be used to estimate equivalent shear modulus and mass density of cement by comparing with modeled torsional wave resonances.

FIGS. 3.15-3.18 show example workflows of torsional wave logging in accordance with one or more embodiments.

FIG. 3.15 shows an example flow chart to detect debonding at either the steel casing and cement interface, or the cement and formation interface.

Initially in Element 315-1, an array of monopole torsional waveforms is recorded at a chosen azimuth using circumferential velocity geophones or transducers mounted on sliding pads in contact with the borehole surface.

In Element 315-2, the lowest branch (i.e., the first branch) of torsional mode family is obtained by analyzing the recorded waveforms, e.g., using a modification of Prony's algorithm or a modified matrix pencil algorithm known to those skilled in the art.

In Element 315-3, the recorded waveforms is analyzed, e.g., using a standard Slowness-Time Coherence (STC) algorithm, to detect any non-dispersive arrival. The STC algorithm is designed to estimate phase velocity or slowness of all coherent arrivals (or pulses) from an array of recorded waveforms. This algorithm searches for non-dispersive coherent pulses in a chosen processing window of bandpass filtered array of recorded waveforms.

In Element 315-4, the result obtained from Element 315-2 and Element 315-3 are compared to determine if there is any indication of formation non-dispersive shear slowness. The STC algorithm outputs a peak semblance for a non-dispersive arrival with a shear slowness of about 140.5 µs/ft using a bandpass filter of 2 to 10 kHz as illustrated in FIG. 3.3. In addition, this algorithm can also identify the steel shear slowness with a smaller semblance when it is present in the recorded waveforms within the chosen bandpass filter.

Good bonding at both casing/cement interface and cement/formation interface are confirmed by the positive indication (Element 315-7). A positive indication example is shown in FIG. 3.3 where the vertical axis intercept of the non-dispersive first branch is consistent with that of the formation shear slowness. Otherwise the workflow proceeds to Element 315-5.

In Element 315-5, the result obtained from Element 315-2 and Element 315-3 are compared to determine if there is any indication of steel casing non-dispersive shear slowness. The STC algorithm outputs a peak semblance for a non-dispersive arrival with a shear slowness of about 98.3 µs/ft using a bandpass filter of 2 to 10 kHz as illustrated in FIG. 3.5. Debonding at casing/cement interface is detected by the positive indication (Element 315-8). A positive indication example is shown in FIG. 3.5 where the vertical axis intercept of the non-dispersive first branch is consistent with that of the steel shear slowness. Otherwise the workflow proceeds to Element 315-6.

In Element 315-6, the result obtained from Element 315-2 and Element 315-3 are compared to determine if there is any indication of average shear slowness of steel casing and cement. The STC algorithm outputs a peak semblance for a non-dispersive arrival with a shear slowness of about 105 µs/ft using a bandpass filter of 2 to 10 kHz as illustrated in FIG. 3.7. Notice that the estimated shear slowness of 105 µs/ft is a weighted average of steel shear slowness of 98.3 µs/ft and cement shear slowness of 152.4 µs/ft. (Debonding at the cement/formation interface is detected by the positive indication (Element 315-9). A positive indication example is shown in FIG. 3.7 where a biased torsional shear slowness at low frequencies is approximately the average shear slowness of steel casing and cement. Otherwise the workflow proceeds to Element 315-5.

FIG. 3.16 shows an example flow chart to identify the presence of fluid channels in the cement annulus.

Initially in Element 316-1, an array of monopole torsional waveforms is recorded at multiple azimuths over 360 degrees using circumferential velocity geophones or transducers mounted on sliding pads in contact with the borehole surface.

In Element 316-2, a polar plot of torsional wave amplitudes is generated as a function of azimuth over the 360 degrees range. An example polar plot is shown in FIG. 3.9 above.

In Element 316-3, the tool azimuth corresponding to the maximum torsional wave amplitude is identified. For example, the maximum torsional wave amplitude is identified as obtained from a particular receiver in the example polar plot of FIG. 3.9

In Element 316-4, the orientation of the receiver azimuth from the North is obtained using magnetometers or other tool orientation measurement systems. For example, the orientation of the receiver is determined as 0 degree azimuth in the example polar plot of FIG. 3.9.

In Element 316-5, normalized differences between the maximum and minimum torsional wave amplitudes (referred to as normalized spread) are determined as a function of axial distance from the torsional wave transducer. An example is shown in FIG. 3.11 above.

In Element 316-6, the axial distance where the normalized spread exceeds certain threshold is identified and used as an indicator of the fluid channel. For example, the normalized spread shows a wide variation across the axial distance range from 100 cm through at least 250 cm in the example shown in FIG. 3.11.

In Element 316-7, the torsional waveforms are processed to obtain the lowest-order (i.e., first order) torsional branch associated with the formation shear slowness.

In Element 316-8, discontinuity(ies) in the formation non-dispersive torsional dispersion are identified at intermediate frequencies (20 to 30 kHz) for axial distances from the transmitter to last receiver. These discontinuity(ies) indicate the presence of fluid channels over this axial interval. An example is shown in FIG. 3.12 *a* where the first branch vertical axis intercept is consistent with the shear slowness of the formation. In addition, a discontinuity in the first branch can be identified in the modal spectrum plots at transmitter-to-receiver distance (TR) ranging from 70 cm to 140 cm In Element 316-9, the fluid channel location (i.e., depth and azimuth) is determined based on the results of Element (316-4), Element (316-6) and Element (316-8).

FIG. 3.17 shows an example flow chart to identify eccentering of steel casing in a borehole.

In Element 317-1, an array of monopole torsional waveforms is recorded at multiple azimuths over 360 degrees using circumferential velocity geophones or transducers mounted on sliding pads in contact with the borehole surface.

In Element 317-2, a polar plot of torsional wave amplitudes is generated as a function of azimuth over the 360 degrees range. An example polar plot is shown in FIG. 3.14 above.

In Element 317-3, normalized differences between the maximum and minimum torsional wave amplitudes (referred to as normalized spread) are determined as a function of axial distance from the torsional wave transducer. An example is shown in FIG. 3.11 above.

In Element 317-4, computed relative torsional wave amplitude differences based on modeled eccentricities between a pair of far and near torsional wave receivers and the measured normalized spread are compared as a function of axial position from the torsional wave transmitter to provide an estimate of the amount of eccentering.

In Element 317-5, the recorded waveforms are decomposed at multiple azimuths into monopole torsional, dipole flexural, and quadrupole waveforms In Element 317-6, the torsional, dipole flexural, and quadrupole waveforms are analyzed to identify if any torsional, dipole flexural, and/or quadrupole dispersions exist. Any dipole flexural and/or quadrupole dispersions indicate steel casing eccentricity in the borehole.

In Element 317-7, the results from Element (317-4) and Element (317-7) are combined to confirm the steel casing eccentering details.

FIG. 3.18 shows an example flow chart to estimate changes in the equivalent cement shear modulus and mass density caused by the presence of fluid channels. In particular, one or more fluid channels have been identified in the cement annulus using the workflow described in reference to FIG. 3.16 above.

In Element 318-1, measured. An example of measuring torsional resonances of the cement is shown in FIG. 3.7 above.

In Element 318-2, modeled torsional resonances of the cement annulus for the same casing diameter and hole size but based on a given cement mass density and a range of shear modulus are compared to the measured cement resonances. Further, modeled torsional resonances of the cement annulus based on a given shear modulus and a range of mass densities are compared to the measured cement resonances. These modeled resonances are based on a modeled cement annulus with uniform mechanical properties. In other words, the modeled mass density and shear modulus are assumed to be uniform throughout the cement annulus.

In Element 318-3, a combination of mass density and shear modulus are identified where the difference between measured and modeled torsional resonances is below a threshold determined by the measurement accuracy. This shear modulus and mass density represent equivalent mechanical properties of the cement annulus in the presence of fluid channels.

Figure 4:
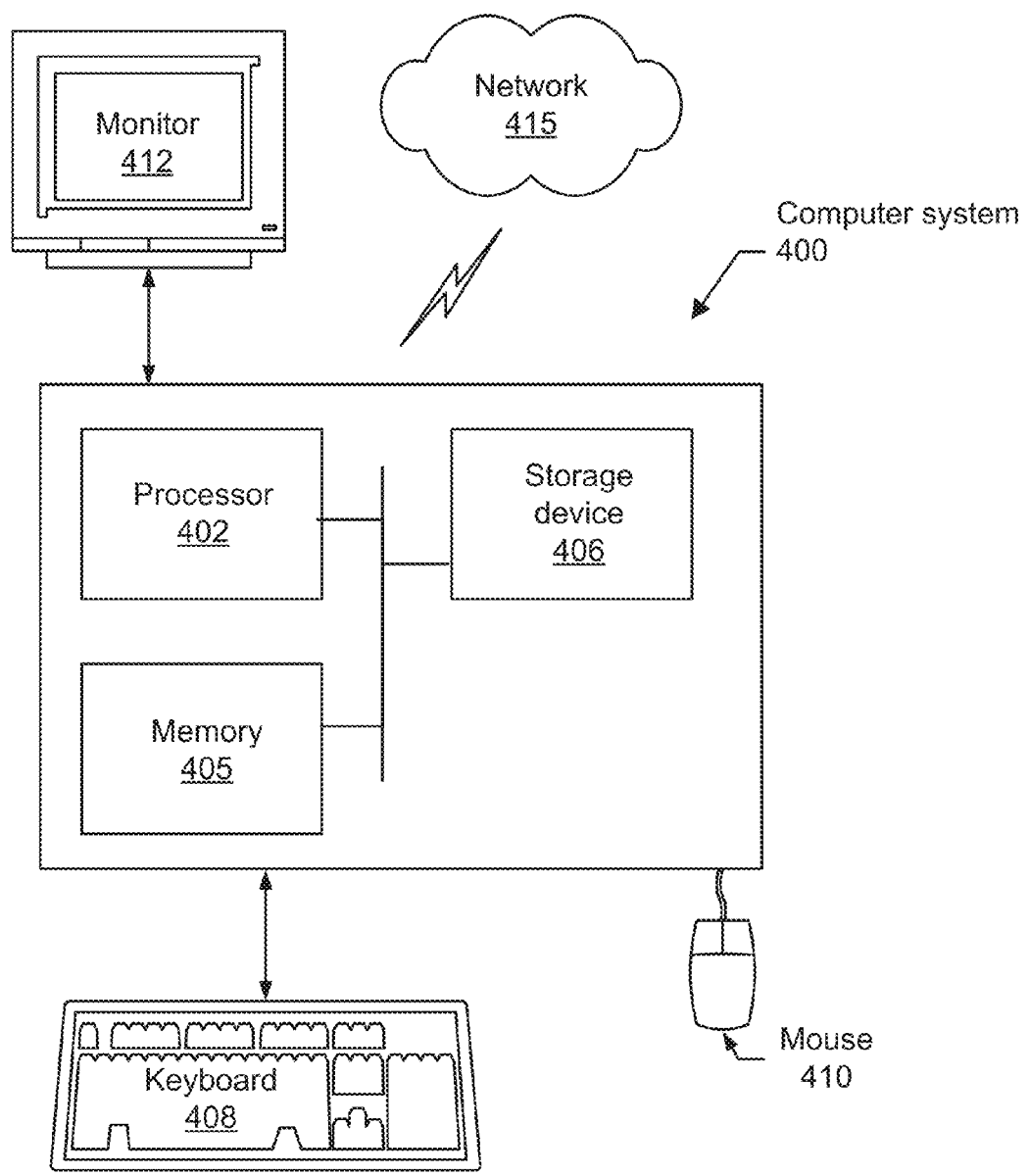
FIG. 4 shows a computer system using which one or more embodiments of torsional wave logging may be implemented.

Embodiments of torsional wave logging may be implemented on virtually any type of computer regardless of the platform being used. For instance, as shown in FIG. 4, a computer system (400) includes one or more processor(s) (402) such as a central processing unit (CPU) or other hardware processor, associated memory (405) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display LCD, a plasma display, or cathode ray tube (CRT) monitor). The computer system (400) may be connected to a network (415) (e.g., a local area network (LAN), a wide area network (WAN) such as the Internet, or any other similar type of network) via a network interface connection (not shown). Those skilled in the art will appreciate that many different types of computer systems exist (e.g., workstation, desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (400) includes at least the minimal processing, input and/or output means necessary to practice one or more embodiments.

Further, those skilled in the art will appreciate that one or more elements of the aforementioned computer system (400) may be located at a remote location and connected to the other elements over a network. Further, one or more embodiments may be implemented on a distributed system having a plurality of nodes, where each portion of the implementation may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape or any other computer readable storage device.

While torsional wave logging has been described with respect to a limited number of embodiments, those skilled in the art, having benefit of this disclosure, will appreciate that other embodiments may be devised which do not depart from the scope of torsional wave logging as disclosed herein. Accordingly, the scope of torsional wave logging should be limited only by the attached claims.

What is claimed is:
1. A method for torsional wave logging in a borehole of a subterranean formation, comprising:
   obtaining a torsional wave measurement of the borehole,
   wherein the torsional wave measurement represents characteristics of a torsional wave propagating within a cylindrical layered structure associated with the bore- hole, wherein the cylindrical layered structure comprises the subterranean formation and a completion of the borehole;

analyzing, by a computer processor, the torsional wave measurement to generate a quality measure of the completion, wherein analyzing the torsional wave measurement to generate the quality measure of the completion comprises:

analyzing the torsional wave measurement to generate a modal spectrum; and analyzing the modal spectrum to generate the quality measure of the completion; and displaying the quality measure of the completion.

2. The method of claim 1, further comprising:

performing a field operation based at least on the quality measure of the completion.

3. The method of claim 1, further comprising:

detecting, based on the quality measure of the completion, a pre-determined failure of the completion; and generating, in response to detecting the pre-determined failure, an alert.

4. The method of claim 1, wherein analyzing the torsional wave measurement further comprises:

analyzing, using a pre-determined algorithm, the torsional wave measurement to generate the modal spectrum, wherein the modal spectrum comprises a completion quality dependent parameter of the torsional wave as a function of a frequency of the torsional wave, wherein the modal spectrum corresponds to a pre-determined wave mode of a plurality of wave modes of the torsional wave; and analyzing, based on a pre-determined criterion, the modal spectrum to generate the quality measure of the completion, wherein the completion comprises a casing and a filled annulus between the casing and the subterranean formation, and wherein the quality measure of the completion represents at least one selected from a group consisting of a first bonding condition between the casing and the filled annulus, a second bonding condition between the filled annulus and the subterranean formation, and presence of fluid channel in the cylindrical layered structure.

5. The method of claim 4, wherein the completion quality dependent parameter comprises slowness of the pre-determined wave mode.

6. The method of claim 5, wherein the quality measure identifies the first bonding condition and the second bonding condition as high quality when a low frequency slowness of the modal spectrum is within a pre-determined range of a far-field slowness of the subterranean formation, wherein the quality measure identifies the first bonding condition as poor quality when the low frequency slowness of the modal spectrum is within a pre-determined range of casing material slowness of the casing, wherein the quality measure identifies the second bonding condition as poor quality when the low frequency slowness of the modal spectrum is within a pre-determined range of a filling material slowness of the filled annulus, and wherein the quality measure identifies the presence of fluid channel in the cylindrical layered structure when a discontinuity of the modal spectrum exceeds a pre-determined threshold.

7. The method of claim 5, wherein the quality measure identifies the first bonding condition and the second bonding condition as high quality when an intercept of the modal spectrum is within a pre-determined range of a resonance frequency of the subterranean formation, wherein the quality measure identifies the first bonding condition as poor quality when the intercept of the modal spectrum is within a pre-determined range of a slowness of the resonance frequency of the casing, and wherein the quality measure identifies the second bonding condition as poor quality when the intercept of the modal spectrum is within a pre-determined range of the resonance frequency of the filled annulus.

8. The method of claim 1, wherein obtaining the torsional wave measurement of the borehole comprises generating the torsional wave using a source that is in contact with the completion.

9. The method of claim 1, wherein obtaining the torsional wave measurement of the borehole comprises recording the torsional wave using a plurality of receivers that are in contact with the completion.

10. A non-transitory computer readable medium storing instructions for torsional wave logging in a borehole of a subterranean formation, the instructions when executed causing a computer processor to:

obtain a torsional wave measurement of the borehole, wherein the torsional wave measurement represents characteristics of a torsional wave propagating within a cylindrical layered structure associated with the borehole, wherein the cylindrical layered structure comprises the subterranean formation and a completion of the borehole;

analyze the torsional wave measurement to generate a quality measure of the completion, wherein analyzing the torsional wave measurement to generate the quality measure of the completion comprises:

analyzing the torsional wave measurement to generate a modal spectrum; and analyzing the modal spectrum to generate the quality measure of the completion; and display the quality measure of the completion.

11. The non-transitory computer readable medium of claim 10, wherein analyzing the torsional wave measurement further comprises:

analyzing, using a pre-determined algorithm, the torsional wave measurement to generate the modal spectrum, wherein the modal spectrum comprises a completion quality dependent parameter of the torsional wave as a function of a frequency of the torsional wave, wherein the modal spectrum corresponds to a pre-determined wave mode of a plurality of wave modes of the torsional wave; and analyzing, based on a pre-determined criterion, the modal spectrum to generate the quality measure of the completion, wherein the completion comprises a casing and a filled annulus between the casing and the subterranean formation, and wherein the quality measure of the completion represents at least one selected from a group consisting of a first bonding condition between the casing and the filled annulus, a second bonding condition between the filled annulus and the subterranean formation, and presence of fluid channel in the cylindrical layered structure.

12. The non-transitory computer readable medium of claim 11,
wherein the completion quality dependent parameter comprises slowness of the pre-determined wave mode,
wherein the quality measure identifies the first bonding condition and the second bonding condition as high quality when a low frequency slowness of the modal spectrum is within a pre-determined range of a far-field slowness of the subterranean formation,
wherein the quality measure identifies the first bonding condition as poor quality when the low frequency slowness of the modal spectrum is within a pre-determined range of casing material slowness of the casing,
wherein the quality measure identifies the second bonding condition as poor quality when the low frequency slowness of the modal spectrum is within a pre-determined range of a filling material slowness of the filled annulus, and
wherein the quality measure identifies the presence of fluid channel in the cylindrical layered structure when a discontinuity of the modal spectrum exceeds a pre-determined threshold.

13. The non-transitory computer readable medium of claim 11,
wherein the completion quality dependent parameter comprises slowness of the pre-determined wave mode,
wherein the quality measure identifies the first bonding condition and the second bonding condition as high quality when an intercept of the modal spectrum is within a pre-determined range of a resonance frequency of the subterranean formation,
wherein the quality measure identifies the first bonding condition as poor quality when the intercept of the modal spectrum is within a pre-determined range of a slowness of the resonance frequency of the casing, and
wherein the quality measure identifies the second bonding condition as poor quality when the intercept of the modal spectrum is within a pre-determined range of the resonance frequency of the filled annulus.

14. A method for torsional wave logging in a borehole of a subterranean formation, comprising:
obtaining a torsional wave measurement of the borehole, wherein the torsional wave measurement represents characteristics of a torsional wave propagating within a cylindrical layered structure associated with the borehole, wherein the cylindrical layered structure comprises the subterranean formation and a completion of the borehole;
analyzing, by a computer processor, the torsional wave measurement to generate a quality measure of the completion, wherein analyzing the torsional wave measurement to generate a quality measure of the completion comprises:
analyzing the torsional wave measurement to generate a torsional wave magnitude dependency on azimuth; and
analyzing the torsional wave magnitude dependency on azimuth to generate the quality measure of the completion; and
displaying the quality measure of the completion.

15. The method of claim 14,
wherein analyzing the torsional wave measurement further comprises:
analyzing, using a pre-determined algorithm, the torsional wave measurement to determine the torsional wave magnitude dependency on azimuth; and
analyzing, based on a pre-determined criterion, the torsional wave magnitude dependency on azimuth to generate the quality measure of the completion,
wherein the completion comprises a casing and a filled annulus between the casing and the subterranean formation, and
wherein the quality measure of the completion identifies presence of fluid channel in the cylindrical layered structure when the torsional wave magnitude is less than a pre-determined threshold for any multi-pole wave mode of the torsional wave, and
wherein the quality measure of the completion identifies eccentricity between the casing and the borehole when the torsional wave magnitude exceeds the pre-determined threshold for at least one multi-pole wave mode of the torsional wave.

16. The method of claim 14, wherein obtaining the torsional wave measurement of the borehole comprises generating the torsional wave using a source that is in contact with the completion.

17. The method of claim 14, wherein obtaining the torsional wave measurement of the borehole comprises recording the torsional wave using a plurality of receivers that are in contact with the completion.

18. A non-transitory computer readable medium storing instructions for torsional wave logging in a borehole of a subterranean formation, the instructions when executed causing a computer processor to:
obtain a torsional wave measurement of the borehole, wherein the torsional wave measurement represents characteristics of a torsional wave propagating within a cylindrical layered structure associated with the borehole, wherein the cylindrical layered structure comprises the subterranean formation and a completion of the borehole;
analyze the torsional wave measurement to generate a quality measure of the completion, wherein analyzing the torsional wave measurement to generate a quality measure of the completion comprises:
analyzing the torsional wave measurement to generate a torsional wave magnitude dependency on azimuth; and
analyzing the torsional wave magnitude dependency on azimuth to generate the quality measure of the completion; and
display the quality measure of the completion.

* * * * *